(12) United States Patent
Keefer

(10) Patent No.: US 6,176,897 B1
(45) Date of Patent: Jan. 23, 2001

(54) HIGH FREQUENCY PRESSURE SWING ADSORPTION

(75) Inventor: Bowie G. Keefer, Vancouver (CA)

(73) Assignee: Questor Industries Inc., Burnaby (CA)

( * ) Notice: Under 35 U.S.C. 154(b), the term of this patent shall be extended for 0 days.

(21) Appl. No.: 09/000,844

(22) Filed: Dec. 30, 1997

Related U.S. Application Data

(60) Provisional application No. 60/034,800, filed on Dec. 31, 1996.

(51) Int. Cl.[7] .................................................. B01D 53/047
(52) U.S. Cl. .................................. 95/98; 95/96; 95/101; 95/102; 95/105; 95/130; 95/139; 96/115; 96/130; 96/144; 96/154
(58) Field of Search ............................... 95/96–106, 117, 95/130, 11, 139; 96/108–154

(56) References Cited

U.S. PATENT DOCUMENTS

| | | | |
|---|---|---|---|
| 2,038,071 | * | 4/1936 | Wilhelm ........................ 96/139 X |
| 2,973,828 | * | 3/1961 | Engle ............................... 96/118 |
| 3,236,028 | * | 2/1966 | Rutan ........................... 96/113 X |
| 4,108,617 | * | 8/1978 | Frantz ........................... 96/126 X |
| 4,169,715 | * | 10/1979 | Eriksson ........................ 96/114 |
| 4,207,084 | * | 6/1980 | Gardner .......................... 96/113 |
| 4,269,611 | * | 5/1981 | Anderberg ..................... 96/124 |
| 4,289,513 | * | 9/1981 | Brownhill et al. ............. 96/135 |
| 4,290,789 | * | 9/1981 | Newton .......................... 96/126 |
| 4,402,717 | * | 9/1983 | Izumo et al. .................. 96/118 |
| 4,530,705 | * | 7/1985 | Firey ............................. 96/116 |
| 4,801,308 | * | 1/1989 | Keefer ........................ 96/113 X |
| 4,877,429 | * | 10/1989 | Hunter ........................ 96/115 X |
| 4,948,401 | * | 8/1990 | Izumi et al. ................ 96/130 X |
| 4,968,329 | * | 11/1990 | Keefer ........................ 96/149 X |
| 5,071,453 | * | 12/1991 | Hradek et al. ................. 96/111 |
| 5,120,331 | * | 6/1992 | Landy ........................ 96/135 X |
| 5,256,172 | * | 10/1993 | Keefer ........................ 96/130 X |
| 5,338,450 | * | 8/1994 | Maurer ....................... 96/152 X |
| 5,354,361 | * | 10/1994 | Coffield ..................... 96/109 X |
| 5,827,358 | * | 10/1998 | Kulish et al. ................ 96/124 X |

* cited by examiner

Primary Examiner—Robert Spitzer

(57) ABSTRACT

Pressure swing adsorption separation of a feed gas mixture, to obtain a purified product gas of the less strongly adsorbed fraction of the feed gas mixture, is performed in a plurality of preferably an even number of adsorbent beds, with each adsorbent bed communicating at its product end directly to a variable volume expansion chamber, and at its feed end by directional valves to a feed compressor and an exhaust vacuum pump. For high frequency operation of the pressure swing adsorption cycle, a high surface area layered support is used for the adsorbent. The compressor and vacuum pump pistons may be integrated with the cycle, reciprocating at twice the cycle frequency. Alternative configurations of the layered adsorbent beds are disclosed.

76 Claims, 22 Drawing Sheets

HIGH FREQUENCY PRESSURE SWING ADSORPTION

This application claims benefit of provisional application 60/034,800 filed Dec. 31, 1996.

TECHNICAL FIELD

The invention relates to gas separations conducted by pressure swing adsorption, and more particularly to air separation to generate concentrated oxygen or to air purification to remove carbon dioxide or vapour contaminants.

BACKGROUND ART

Gas separation by pressure swing adsorption is achieved by coordinated pressure cycling and flow reversals over an adsorbent bed which preferentially adsorbs a more readily adsorbed component relative to a less readily adsorbed component of the mixture. The total pressure is elevated during intervals of flow in a first direction through the adsorbent bed, and is reduced during intervals of flow in the reverse direction. As the cycle is repeated, the less readily adsorbed component is concentrated in the first direction, while the more readily adsorbed component is concentrated in the reverse direction.

The conventional process for gas separation by pressure swing adsorption uses two or more adsorbent beds in parallel, with directional valving at each end of each adsorbent bed to connect the beds in alternating sequence to pressure sources and sinks, thus establishing the changes of working pressure and flow direction. This conventional pressure swing adsorption process also makes inefficient use of applied energy, because of irreversible expansion over the valves while switching the adsorbent beds between higher and lower pressures.

The prior art also includes the following pressure swing adsorption devices with cyclically operated volume displacement means reciprocating at the same frequency at both ends of an adsorbent bed, to generate pressure changes internally and thus improve energy efficiency.

Keller (U.S. Pat. No. 4,354,859) has disclosed a single bed pressure swing adsorption device for purifying both components of a binary gas mixture fed to a central point of the adsorbent bed. This device has volume displacement means which may be pistons or diaphragms, of specified unequal displacements at opposite ends of the bed.

My U.S. Pat. No. 4,702,903 discloses use of modified Stirling or Ericsson cycle machines for performing gas separations, in which expansion energy of the PSA cycle is recovered and heat may be applied directly through the modified Stirling cycle as a supplemental energy source to perform pressure swing adsorption gas separations.

My U.S. Pat. Nos. 4,801,308 and 4,968,329 disclose related gas separation devices with valve logic means to provide large exchanges of fresh feed gas for depleted feed gas. Such large feed exchanges, or effective scavenging, may be required when concentrating one component as a desired product without excessively concentrating or accumulating other components, as in concentrating oxygen from feed air containing water vapour whose excessive concentration and accumulation would deactivate the adsorbent.

My U.S. Pat. No. 5,082,473 discloses related multistage devices for with extraction and simultaneous concentration of trace components.

All of the above cited devices use reciprocating pistons or equivalent volume displacement mechanisms for establishing the cyclic pressure and reversing flow regime of PSA cycles. With relatively low PSA cycle frequencies attainable with conventional granular adsorbent beds, the reciprocating machinery is bulky and costly. Hence, there is a need for rigid high surface area adsorbent supports which can overcome the limitations of granular adsorbent and enable much higher cycle frequencies. High surface area rigid adsorbent supports, comprised of monoliths, stacked or spirally wound adsorbent-impregnated sheet material, are disclosed in my U.S. Pat. Nos. 4,702,903; 4,801,308; 4,968,329; and 5,082,473.

Small scale gas separation devices based on the above cited U.S. patents have been built and operated successfully, for applications including air separation and hydrogen purification. These devices all use mechanical pistons to generate the necessary reciprocating internal volume displacements, in a flow-regulated pressure swing adsorption cycle operating at relatively high frequency. Although adsorbent inventories are reduced compared to most conventional pressure swing adsorption systems, the piston swept volume must considerably exceed the volume of the adsorbent bed in order to generate the desired pressure ratio between minimum and maximum working pressures. In order to achieve the desired functions and energy efficiency, the piston drive mechanism must be adapted to exchange compression energy between adsorbent columns undergoing compression and expansion steps. With the cycle speeds permitted by commercial adsorbent pellets in packed beds (typically not exceeding a practicable limit of 50 RPM indicated by theoretical analysis and test experience), scale-up of such devices using pistons to larger scale tonnage air separation or hydrogen purification applications would be difficult owing to the large and heavily loaded low-speed reciprocating drive mechanisms which would be necessary.

DISCLOSURE OF INVENTION

The present invention provides a process for separating first and second components of a feed gas mixture, the first component being more readily adsorbed under increase of pressure relative to the second component which is less readily adsorbed under increase of pressure over an adsorbent material, such that a gas mixture of the first and second components contacting the adsorbent material is relatively enriched in the first component at a lower pressure and is relatively enriched in the second component at a higher pressure when the pressure is cycled between the lower and higher pressures at a cyclic frequency of the process defining a cycle period; providing for the process an even number "N" of substantially similar adsorbent beds of the adsorbent material, with said adsorbent beds having first and second ends; and further providing a variable volume expansion chamber for each adsorbent bed and communicating to the second end of each adsorbent bed, the expansion chamber having a displacement volume defined as the difference between its maximum volume and its minimum volume; and performing in each adsorbent bed the sequentially repeated steps within the cycle period of:

(A) supplying a flow of the feed gas mixture to the first end of the adsorbent bed during a feed time interval commencing when the pressure within the adsorbent bed is a first intermediate pressure between the lower pressure and the higher pressure, pressurizing the adsorbent bed to substantially the higher pressure, and then continuing the flow of feed gas mixture at substantially higher pressure while expanding the volume of the expansion chamber from its minimum volume to withdraw gas enriched in the second component from the second end of the adsorbent bed, and also delivering some gas enriched in the second component as a light product gas at a light product delivery pressure which is typically the higher pressure less minor pressure drops due to flow friction, (B) while flow at the first end of the adsorbent bed is stopped during a cocurrent blowdown time interval, withdrawing a flow of gas enriched in the second component as light reflux gas from the second end of the adsorbent bed into the expansion chamber, and further expanding the volume of the expansion chamber so as to depressurize the adsorbent bed from the higher pressure toward a second intermediate pressure between the higher pressure and the lower pressure, (C) withdrawing a flow of gas enriched in the first component from the first end of the adsorbent bed during an exhaust time interval including countercurrent blowdown and purge steps, so as to depressurize the adsorbent bed from the second intermediate pressure to the lower pressure, and then contracting the volume of the expansion chamber so as to supply light reflux gas from the expansion chamber to the second end of the adsorbent bed to purge the adsorbent bed at substantially the lower pressure while continuing to withdraw gas enriched in the first component as a heavy product gas, and (D) while flow at the first end of the adsorbent bed is stopped, further contracting the expansion chamber to its minimum volume during a light reflux pressurization time interval, so as to supply light reflux gas from the expansion chamber to the second end of the adsorbent bed to increase the pressure of the adsorbent bed from substantially the lower pressure to the first intermediate pressure.

The process may be controlled by varying cycle frequency so as to achieve desired purity, recovery and flow rate of the light product gas. Alternatively, the feed flow rate and the light product flow rate may be adjusted at a given cycle frequency, so as to achieve desired light product purity. The light product delivery pressure may alternatively be controlled downstream as a preferred way to achieve desired light product purity and flow rate.

The first intermediate pressure and second intermediate pressure are typically approximately equal to atmospheric pressure, so that the lower pressure is subatmospheric. In air purification applications, the first component is an impurity gas or vapour, the gas mixture is air containing the impurity, and the light product is purified air. In air separation applications, the first component is nitrogen, the second component is oxygen, the adsorbent material includes a nitrogen-selective zeolite, the gas mixture is air, and the light product is enriched oxygen.

The invention also provides apparatus for separating such a feed gas mixture, the first component being more readily adsorbed under increase of pressure relative to the second component which is less readily adsorbed under increase of pressure over an adsorbent material, such that a gas mixture of the first and second components contacting the adsorbent material is relatively enriched in the first component at a lower pressure and is relatively enriched in the second component at a higher pressure when the pressure is cycled between the lower and higher pressures at a cyclic frequency of the process defining a cycle period, the apparatus including (a) a number "N" of substantially similar adsorbent beds of the adsorbent material, with said adsorbent beds having first and second ends defining a flow path through the adsorbent material, (b) a feed valve means and an exhaust valve means connected to the first end of each adsorbent bed, (c) valve actuation means to actuate the feed valve means and the exhaust valve means, so that at any instant one of the feed or exhaust valve means may be open with the other closed or else both of the feed and exhaust valve means are closed, (d) feed supply means to introduce the feed gas mixture to the feed valve at a feed pressure, (e) exhaust means to remove gas enriched in the first component from the purge exhaust port of the first distributor valve.

(f) light product delivery means to deliver a light product flow of gas enriched in the second component from the second ends of the adsorbent beds;

(g) a variable volume expansion chamber communicating to the second end of each adsorbent bed, and (h) expansion chamber cycling means to vary the volume of the expansion chamber between minimum and maximum volumes of the expansion chamber at the cyclic frequency, with the minimum volume being reached at a top dead centre time within the cycle period, and the maximum volume being reached at a bottom dead centre time within the cycle period;

and the valve actuation means cooperates with the expansion chamber cycling means so that for each adsorbent bed:

(i) the valve actuation means opens the feed valve when the expansion chamber is approaching its minimum volume and when the pressure in the adsorbent bed is less than the higher pressure, keeps the feed valve open during a feed time interval while the expansion chamber cycling means brings the volume of the expansion chamber past its minimum volume and the pressure in the adsorbent bed has risen to substantially the higher pressure, and closes the feed valve following the top dead centre time by a feed phase lag interval, (ii) the valve actuation means opens the exhaust valve when the expansion chamber is approaching its maximum volume and when the pressure in the adsorbent bed is greater than the minimum pressure, keeps the exhaust valve open during an exhaust time interval while the expansion chamber cycling means brings the volume of the expansion chamber past its maximum volume and the pressure in the adsorbent bed has dropped to substantially the lower pressure, and closes the exhaust valve following the top dead centre time by an exhaust phase lag interval, and (iii) the valve actuation means keeps both the feed and exhaust valves closed during a cocurrent blowdown time interval while the pressure in the adsorbent bed is decreasing between the feed and exhaust time intervals, and during a light reflux pressurization time interval while the pressure in the adsorbent bed is increasing between the exhaust and subsequent feed time intervals, with the cycle period being equal to the sum of the feed, cocurrent blowdown, exhaust and light reflux pressurization time intervals.

Typically, the feed time interval, cocurrent blowdown time interval, exhaust time interval and light reflux pressurization interval are each approximately equal to one quarter of the cycle period. The feed phase lag interval is typically approximately equal to the exhaust phase lag interval, and in the range of approximately 30° to 45°, with the cycle period being 360° of phase.

The expansion chamber is typically defined by a piston reciprocating with fluid sealing contact within a cylinder, although embodiments using rotary displacement mechanisms are also contemplated. The expansion chambers provide the "light reflux" function of accepting a portion of the gas enriched in the second component as light reflux gas from a bed at the higher pressure and during cocurrent blowdown to reduce the pressure from the higher pressure, and then returning that gas to the same adsorbent bed to provide purge at the lower pressure and then to provide light reflux pressurization to increase the pressure from the lower pressure.

The light reflux function enables production of the light product with high purity. The use of expansion pistons in the present invention to control light reflux flows provides advantageous positive displacement regulation of the pressure swing adsorption cycle, combined with energy recovery since net work is delivered by each expansion piston over a complete cycle. The pressure within the expansion chamber is typically higher when it is expanding than when it is contracting, thus providing recoverable expansion work. The net expansion work may be further augmented by heating the expansion chamber, most effectively by heating gas that is flowing between the second end of each adsorbent bed and the expansion chamber for that bed.

The expansion pistons provide cocurrent blowdown with final countercurrent depressurization assisted by a vacuum pump, and also provide light reflux pressurization with final pressurization assisted by a feed blower. The use of the vacuum pump and the feed blower to assist respectively in the final stages of blowdown and pressurization is a most important aspect of the present invention, distinguishing over the FIG. 3 embodiment of my U.S. Pat. No. 4,968,329. In that FIG. 3 embodiment, the expansion piston was used to perform the complete pressure changes between the higher and lower pressures, without assistance from a vacuum pump or feed blower. Experimental tests of that FIG. 3 embodiment displayed a marginal capability to attain high purity of enriched oxygen, while recovery and specific productivity (per unit of adsorbent) performance were very low. In contrast, the improved apparatus of the present invention has been tested with excellent results of high purity at high recovery and high specific productivity, for example better than 90% purity oxygen at 59% recovery from air, using commercial Ca-X adsorbent at a ratio between higher and lower pressures of only 2.5:1.

Preferred embodiments have an even number of adsorbent beds. For each opposed pair of adsorbent beds, the feed supply means may include a feed chamber and an exhaust chamber, the feed chamber communicating to an inlet check valve and to the feed valve means for the opposed pair of adsorbent beds, the exhaust chamber communicating to an exhaust check valve and to the exhaust valve means for the opposed pair of adsorbent beds, and with reciprocating drive means to reciprocate the feed chamber and exhaust chamber at twice the cycle frequency to perform feed and exhaust steps for each bed of the opposed pair during a cycle. The feed chamber and the exhaust chamber may be provided within a feed/exhaust cylinder, the cylinder enclosing the feed chamber and exhaust chamber separated by a piston on a piston rod, with the piston rod penetrating the feed chamber so that the ratio of the swept volume of the exhaust chamber to the swept volume of the feed chamber is $[D^2/(D^2-d^2)]$ for piston diameter "D" and piston rod diameter "d", and with the reciprocating drive coupled to the piston rod. Two opposed feed/exhaust cylinders may be coupled on a single piston rod for an embodiment with four adsorbent beds phased 90° apart.

The feed and exhaust valves may be provided as four-way cam-operated spool valves, or rotary four-way valves, or cam-operated poppet valves, for controlling feed and exhaust for pairs of adsorbent beds operating in opposed phase, or four beds phased 90° apart. With each adsorbent bed mounted within its own reciprocating expansion piston, the expansion piston itself may be ported to operate as a three-way spool valve for feed admission and exhaust discharge control.

With a pair of opposed adsorbent beds mounted within a double-acting expansion piston defining opposed expansion chambers for each adsorbent bed of the pair, the expansion piston may be ported as a four-way spool valve to provide feed and exhaust valve functions for both adsorbent beds.

For high frequncy operation, and particularly for adsorbent beds installed inside reciprocating pistons, the adsorbent beds may be provided as layered adsorbent or "adsorbent laminate" formed from flexible adsorbent sheet providing desirable compliance to accommodate stacking or rolling errors, and spacer systems providing necessary stability against unrestrained deflections or distortions that would degrade the uniformity of the flow channels between adjacent layers of adsorbent sheet. Alternating spacer layers may be skewed oppositely to provide stabilization by multiple oblique crossovers. Preferred adsorbent laminate configurations include spiral roll adsorbent beds, with one, two or many leaves; and stacked annular adsorbent sheet discs, configured to provide similarity of all adsorbent sheet discs and flow channels without stack end effects.

MODES FOR CARRYING OUT THE INVENTION

Figure 1:
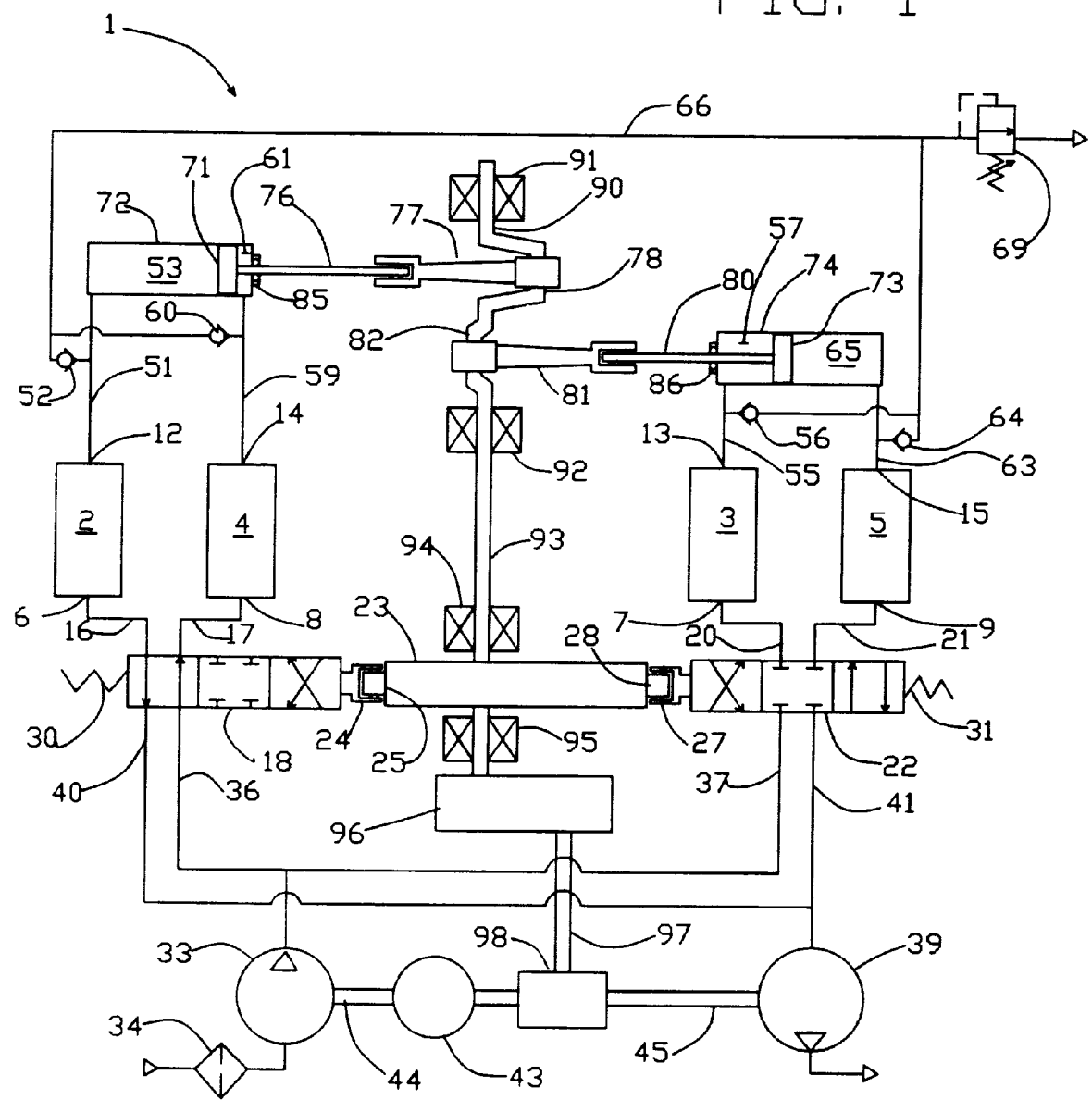
FIG. 1 is a simplified schematic of an oxygen concentrator apparatus with four adsorbent beds, with each bed communicating to an expansion chamber reciprocating at the PSA cycle frequency, a feed air blower, and an exhaust vacuum pump.
Figure 2:
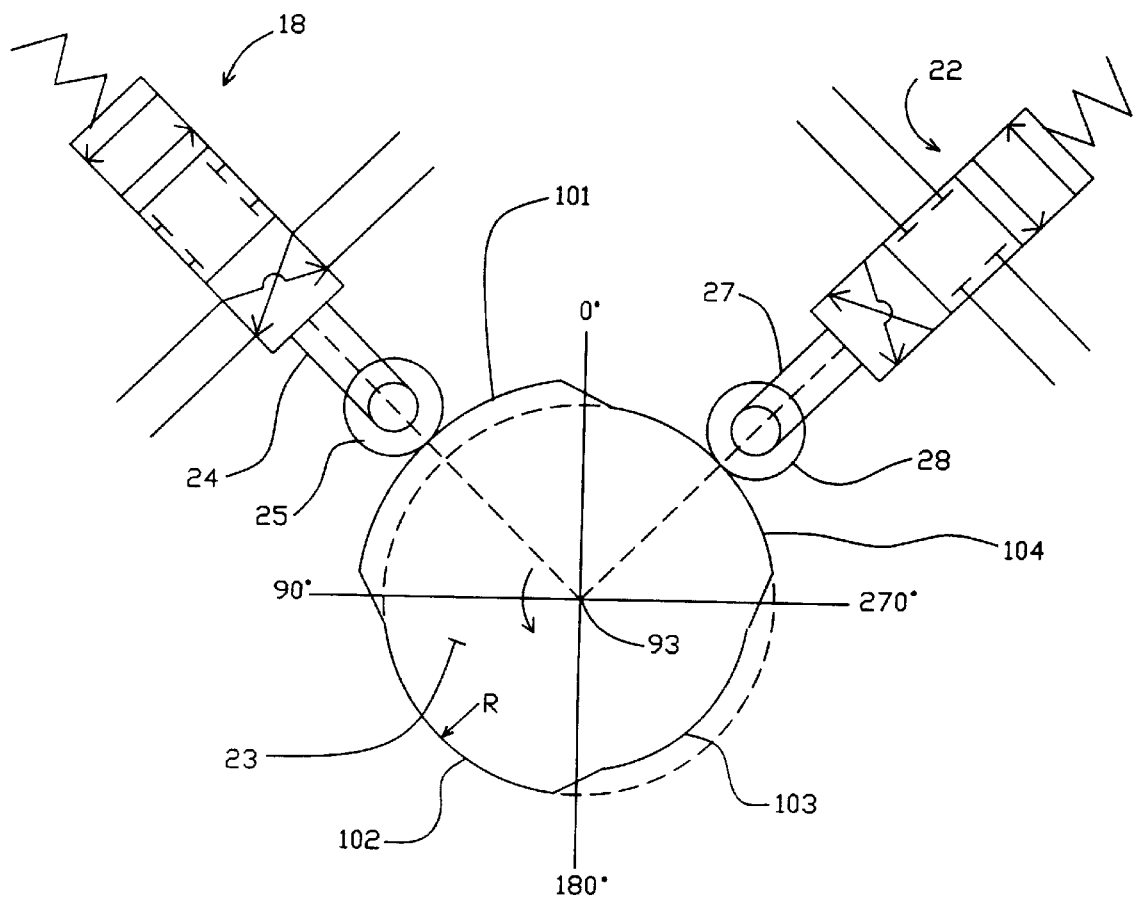
FIG. 2 shows the valve actuation cam profile used in the apparatus of FIG. 1.

FIGS. 1 and 2

FIG. 1 shows a simplified schematic of a four bed PSA oxygen concentrator 1, using expansion pistons for expansion energy recovery.

Apparatus 1 has four adsorbent beds 2, 3, 4 and 5; the adsorbent beds having respectively first ends 6, 7, 8 and 9, and second ends 12, 13, 14 and 15. First ends 6 and 8 communicate by conduits 16 and 17 to four-way valve 18; and first ends 7 and 9 communicate by conduits 20 and 21 to four-way valve 22.

Four-way valves 18 and 22 are three position closed-centre valves. The four-way valves are here depicted as spool valves, respectively actuated by rotary cam 23 acting on cam roller 24 and yoke 25, and by cam roller 27 and yoke 28. Springs 30 and 31 are provided to ensure contact of the cam rollers on cam 23.

Feed blower 33 is provided to draw feed air through inlet filter 34, and supply compressed feed air by conduits 36 and 37 to four-way valves 18 and 22 respectively. Exhaust vacuum pump 39 is provided to exhaust nitrogen-enriched air waste by conduits 40 and 41 from four-way valves 18 and 22 respectively. Motor 43 is provided to drive feed blower 33 by shaft 44 and vacuum pump 39 by shaft 45.

Adsorbent bed second ends 12, 13, 14 and 15 are respectively connected by conduit 51 to product delivery check valve 52 and expansion chamber 53, conduit 55 to product delivery check valve 56 and expansion chamber 57, conduit 59 to product delivery check valve 60 and expansion chamber 61, and conduit 63 to product delivery check valve 64 and expansion chamber 65. Product delivery check valves 52, 56, 60 and 64 deliver concentrated product oxygen to product manifold 66. Flow of oxygen product from manifold 66 to product delivery conduit 68 is controlled by back-pressure regulator 69, which allows product flow whenever the pressure in manifold 66 reaches or exceeds the adjustable pressure setting of regulator 69 and the pressure in product delivery conduit 68 is no higher than the pressure in manifold 66.

Variable volume expansion chambers 53 and 61 are defined by double acting piston 71 in expansion cylinder 72, and expansion chambers 57 and 65 are defined by double acting piston 73 in expansion cylinder 74. Piston 71 is coupled by piston rod 76 and connecting rod 77 to rotary crank 78. Piston 73 is coupled by piston rod 80 and connecting rod 81 to rotary crank 82. Piston rods 76 and 80 are much smaller in diameter than pistons 71 and 73, and are sealed by piston rod seals 85 and 86.

Cranks 78 and 82 are mounted on crankshaft 90, supported by bearings 91 and 92. Crankshaft 90 rotates at the PSA cycle frequency, and is coupled directly by cam shaft extension 93 to rotary cam 23. Cam shaft extension 93 is itself supported by bearings 94 and 95, and is coupled to the motor 43 by gear reducer 96, shaft 97 and right-angle gearbox 98.

The PSA cycle is performed in the four adsorbent beds, with a phase shift of 90° between the beds in the sequence of beds 2, 3, 4 and then 5. Each bed communicates at its second end to an expansion chamber 53, 57, 61 and 65 whose cyclic volume changes are phased 90° apart in that sequence. Each pair of adsorbent beds opposed in phase by 180° (e.g. beds 2 and 4, or beds 3 and 5) is controlled at the feed end of the beds by a four-way spool valve, and at the product end of the beds by a double-acting expansion piston. The expansion pistons are coupled by a mechanical crank linkage to a rotary shaft with a rotary cam actuating the four-way valves.

It will be apparent that expansion chambers 53, 57, 61 and 65 could be equivalently defined by four single-acting cylinders reciprocating at 90° phase intervals, and that flexing diaphragms could be used as an equivalent volume displacement means rather than pistons. FIG. 2 shows the profile of valve actuation cam 23, projected on the axis of shaft 93. The circumference of cam 23 is divided into four quadrants of 90° angular width. The quadrants are defined as quadrant 101 from 0° to 90°, quadrant 102 from 90° to 180°, quadrant 103 from 180° to 270°, and quadrant 104 from 270° back to 0°. Cam rollers 25 of valve 18 is offset from cam roller 28 of valve 22 by 90°. Quadrants 102 and 104 have an equal radius R, determined such that a valve (e.g. valve 22) whose roller is in that quadrant will be in its closed centre position. Quadrant 101 has a radius more than R, such that a valve (e.g. valve 18) whose roller is in that quadrant will be in an open position. Quadrant 103 has a radius less than R, such that a valve whose roller is in that quadrant will be in the opposite open position to its open position when in quadrant 101.

The expansion pistons and 4-way valves reciprocate at the PSA cycle frequency, powered by the expansion energy recovered from the PSA cycle by the pistons. The apparatus includes a feed compressor and a vacuum pump, each connected in turn to each adsorbent bed for ¼ of the cycle period.

Power consumption is reduced since the compressor and vacuum pump each follow the changing pressure of the adsorbent bed for respectively feed pressurization and countercurrent blowdown steps. Thus, the average working pressure across each of the compressor and vacuum pump is much less than the maximum working pressure. With the mechanical speed reduction linkage coupling the expansion pistons to the compressor or vacuum pump motor, the net expansion energy recovered is applied to reduce motor power consumption, and the PSA cycle frequency is established by motor RPM and the ratio of the speed reduction linkage.

Advantages of this cycle are (1) lowest practicable power consumption, (2) simplified self-regulated cycle control by the expansion piston and spool valve mechanism, plus an external control of product back-pressure, (3) complete elimination of solenoid valves and electronic controls, (4) positive exclusion of exhaust gas recycle that may cause water vapour build-up and even condensation in the adsorbent beds, and (5) the option of product flow control by motor speed regulation. This technology lends itself to novel oxygen demand control/response features. Thus, at night the unit might be run slower for reduced oxygen demand while also becoming quieter.

FIG. 3

Apparatus 120 is a closely related device, using double-acting feed/exhaust cylinders 121 and 122 to provide the combined feed compressor and exhaust vacuum pump functions. Feed/exhaust cylinder 121 includes a feed chamber 123 and an exhaust chamber 124, separated by piston 125 on piston rod 126 reciprocating within cylinder 121. Likewise, identical feed/exhaust cylinder 122 includes a feed chamber 133 and an exhaust chamber 134, separated by piston 135 on piston rod 136 reciprocating within cylinder 122.

A feed/exhaust volume displacement ratio is defined as the ratio of the swept volume of the feed chambers to the swept volume of the exhaust chambers, equal to $[D^2/(D^2-d^2)]$ for piston diameter "D" and piston rod diameter "d".

Inlet check valves 140 and 141 are provided to admit feed flow from inlets 142 and 143 to feed chambers 123 and 133 respectively. Exhaust check valves 144 and 145 are provided to discharge exhaust flow from exhaust chambers 123 and 133 respectively.

Piston 125 is reciprocated by connecting rod 150 coupling rotary crank 151 to piston rod 126. Piston 135 is reciprocated by connecting rod 152 coupling rotary crank 151 to piston rod 126. Since both pistons are actuated by the same crank 151, they reciprocate in 180° opposed phase. Rotary crank 151 is carried by shaft 155, supported by bearings 156 and 157, and driven by motor 158.

The feed/exhaust cylinders reciprocate at exactly twice the PSA cycle frequency through a 2:1 ratio of the speed reduction linkage, provided as gear 160 on shaft 155 meshing with gear 161 on shaft 93. Gear 160 has half the diameter of gear 161 to define the 2:1 ratio. The relative rotational phase of shafts 93 and 155, and hence the phase relation of reciprocation of the feed/exhaust cylinders to reciprocation of the expansion cylinders and directional valves, is established by gears 160 and 161.

In the above described embodiments, the most simple system for small capacity oxygen concentrators is to use two 4-way spool valves, each serving two beds. An alternative, more attractive for somewhat larger capacity systems, is to use four 3-way valves, each serving one bed. The 3-way valves can be mechanically cam-operated as in the case of the 4-way valves. A desirable approach with 3-way spool valves is to use a porting configuration which doubles the effective port area for the low pressure exhaust flow compared to the high pressure feed flow, thus allowing use of a smaller valve for the same capacity. Spool valves with clearance seals can achieve dust exclusion by a self-purging principle.

FIG. 4

Figure 3:
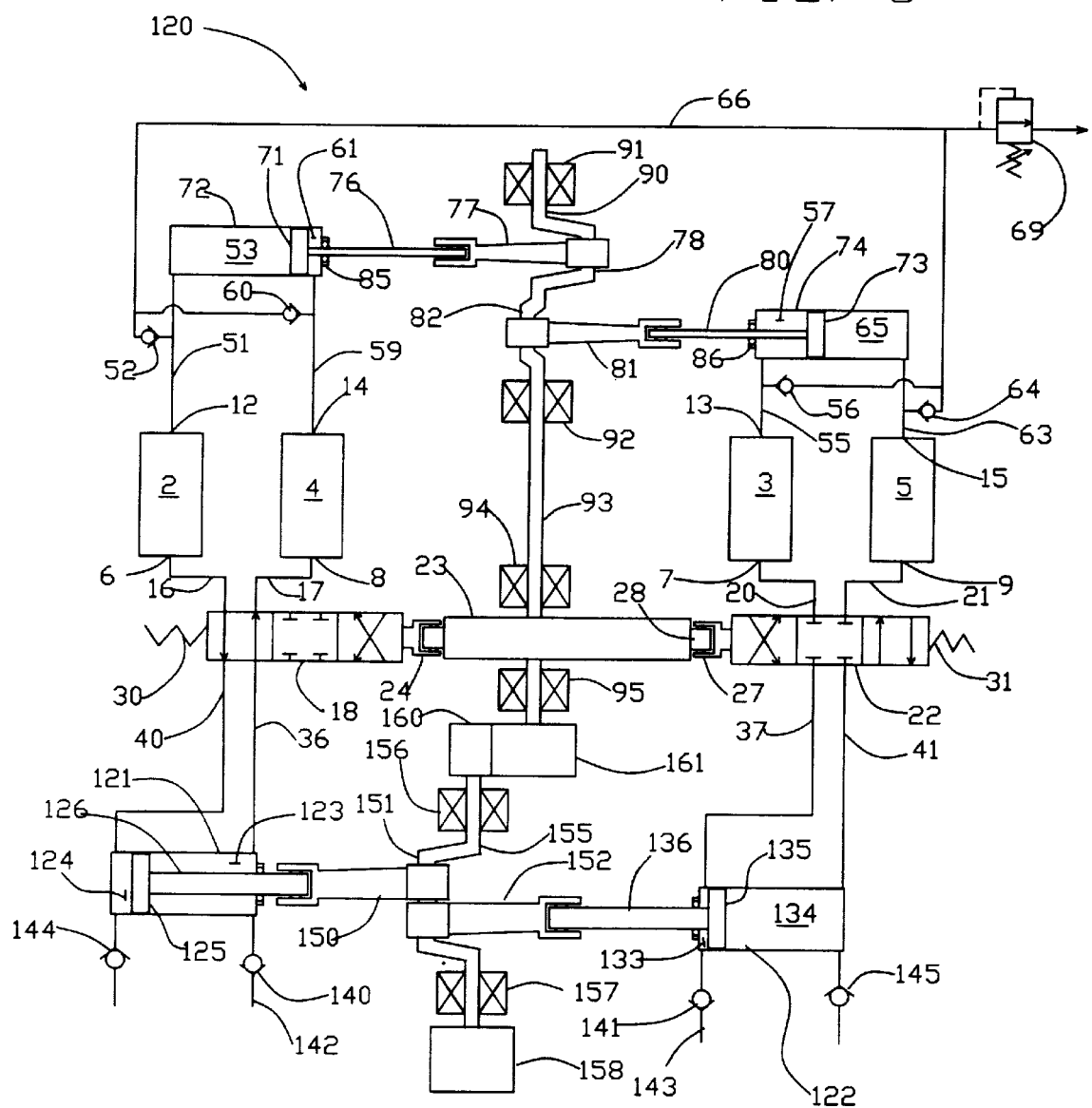
FIG. 3 is a simplified schematic of an apparatus similar to that of FIG. 1, but with the feed blower and exhaust vacuum pump functions provided by double-acting feed/exhaust cylinder reciprocating at twice the PSA cycle frequency.
Figure 4:
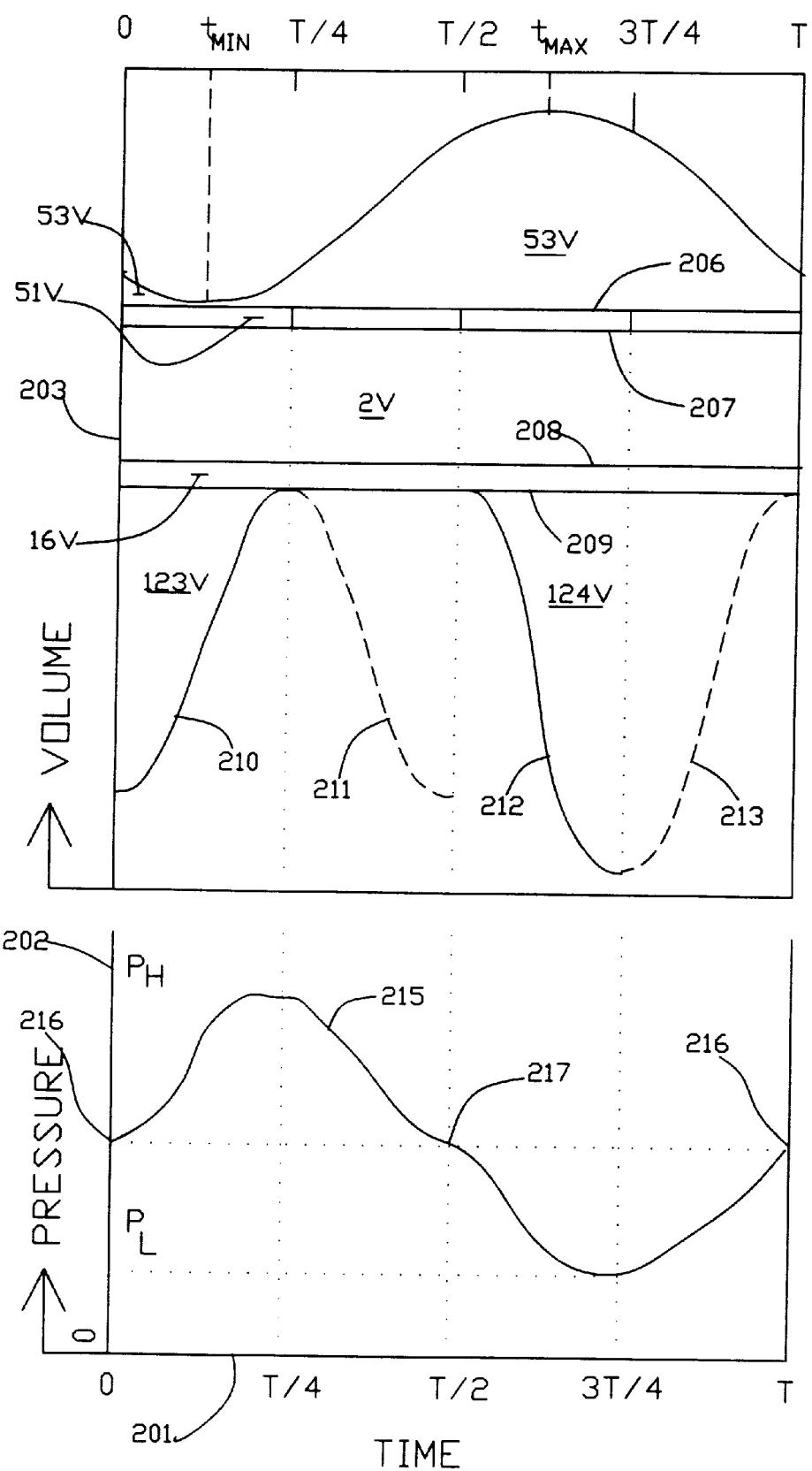
FIG. 4 shows the gas flow pattern and pressure pattern associated with an adsorbent bed of the apparatus of FIG. 3.
Figure 5:
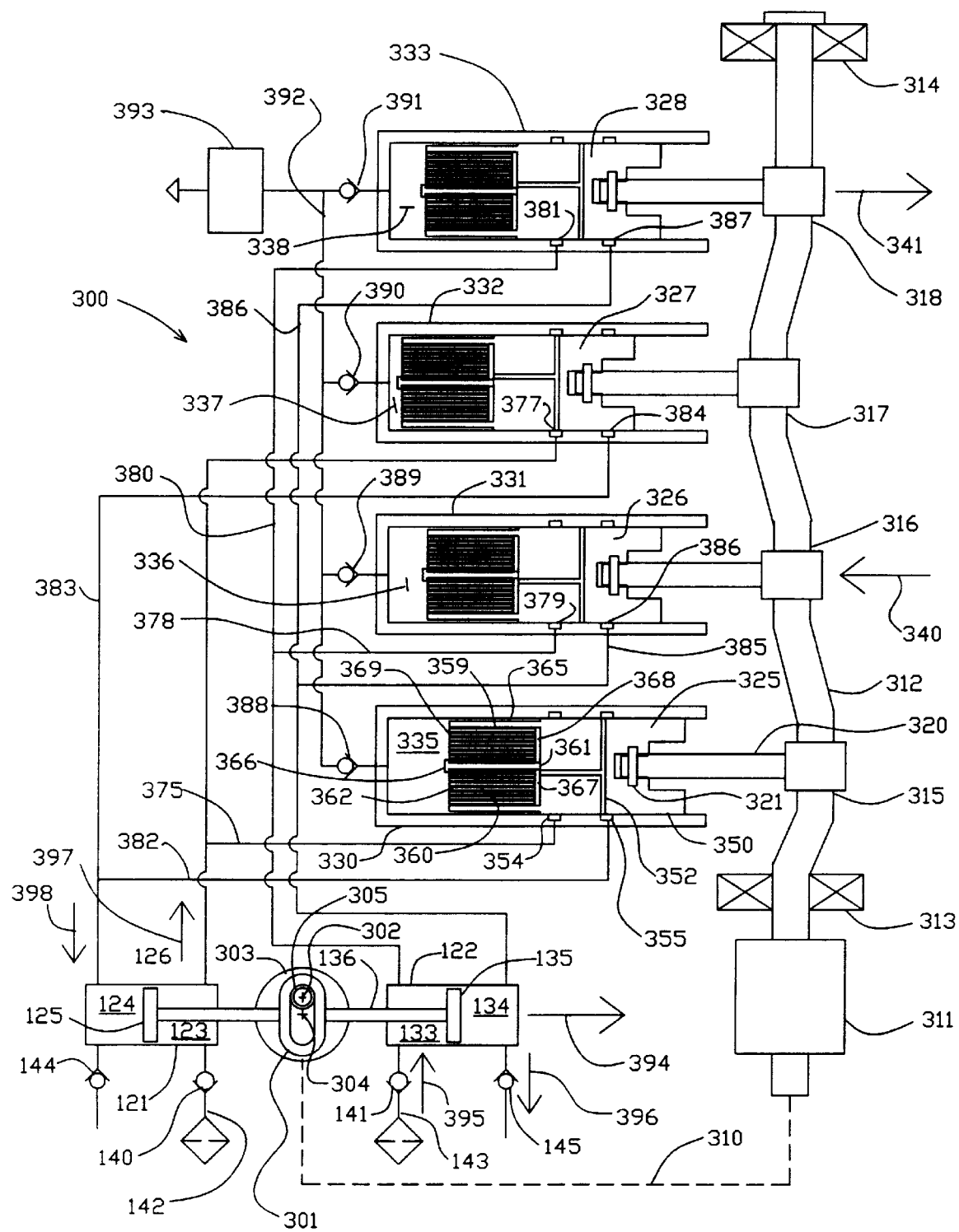
FIG. 5 shows an oxygen concentrator apparatus, with the adsorbent beds provided as spiral rolls of adsorbent loaded sheet material in each expansion piston.

FIG. 4 shows time variation of the gas flow pattern and the pressure pattern over a cycle period in an adsorbent bed of the apparatus of FIG. 3. The horizontal axis 201 of FIG. 4 represents time, in quarter fractions of the cycle period. The vertical axis 202 in the lower part of FIG. 4 represents working pressure in adsorbent bed 2, at for example its first end 6. The vertical axis 203 in the upper part of FIG. 4 represents volumes within the apparatus associated with bed 2.

The suffix "V" is added to the numerals in FIG. 3 of spaces whose corresponding volume is shown. Thus volume 2V is the void volume of adsorbent bed 2, dead volumes 51V and 16V correspond to conduits 51 and 16, varying volume 53V is that of expansion chamber 53, varying volume 123V is that of feed chamber 123 (when communicating to bed 2 through open ports of valve 18), and varying volume 124V is that of exhaust chamber 124 (when communicating to bed 2 through open ports of valve 18). Approximately sinusoidal curve 205 indicates the trajectory of expansion piston 71, varying volume 53V from its minimum value at top dead centre time "$t_{MIN}$" to its maximum value at bottom dead centre time "$t_{MAX}$". At each instant of time, the vertical distance between curve 205 and horizontal line 206 indicates the volume of chamber 53.

Dead volume 16V is defined by horizontal lines 208 and 209. The separation between curve 210 and line 209 shows the compression of a volume 123V from chamber 123 into the working volume. Broken curve 211 shows the induction of feed air into volume 123, in preparation for the next compression stroke to the opposite bed. The separation between curve 212 and line 209 shows the expansion of a volume 124V as chamber 123 draws exhaust gas out of the working volume. Broken curve 213 shows the expulsion of exhaust gas out of volume 123, in preparation for the next vacuum stroke for the opposite bed.

Curve 215 shows the time variation of pressure, cycling between the higher pressure $P_H$ and the lower pressure $P_L$. The maximum or higher pressure $P_H$ is attained when expansion chamber 53 passes its minimum value, while compression chamber 123 approaches its minimum value to deliver feed air into the adsorbent bed while product gas is delivered. The minimum or lower pressure $P_L$ is attained just after expansion chamber 53 has expanded to its maximum volume and has begun to contract, while vacuum chamber 124 is still drawing exhaust gas out of the adsorbent bed.

The cycle is divided into four process steps, here shown as occupying equal time intervals. The feed step (including feed pressurization and feed for light product delivery at the higher pressure) extends over the feed time interval from times 0 to T/4 of the cycle period on horizontal axis 201, the cocurrent blowdown step extends over the cocurrent blowdown interval from T/4 to T/2, the exhaust interval (including countercurrent blowdown and purge) extends over the countercurrent blowdown interval from T/2 to 3T/4, and the light reflux pressurization step extends over the light reflux pressurization time interval from 3T/4 to T completing the cycle.

The light reflux pressurization step begins at the lower pressure and ends at a first intermediate pressure 216. The feed step includes feed pressurization (with some contribution of light reflux pressurization until the expansion chamber has contracted to its minimum volume at top dead centre) from first intermediate pressure 216 to the higher pressure. Typically, the first intermediate pressure is nominally atmospheric pressure. The cocurrent blowdown step begins at substantially the higher pressure and ends at a second intermediate pressure 217, which typically may be approximately equal to the first intermediate pressure 216. The exhaust step performs countercurrent blowdown from second intermediate pressure 217 to the lower pressure, with some continued contribution of cocurrent blowdown until the expansion chamber has expanded to its maximum volume at bottom dead centre.

The feed step ends after top dead centre of the expansion chamber, delayed by a feed phase lag interval extending from $t_{MIN}$ to T/4. Similarly, the exhaust step ends after bottom dead centre of the expansion chamber, delayed by an exhaust feed phase lag interval extending from $t_{MAX}$ to 3T/4. The exhaust phase lag is typically approximately equal to the feed phase lag. The feed phase lag interval may be in the range of 0° to 60°, but preferably in the range of approximately 30° to 45°, with the cycle period being 360° of phase. Experimentally, better performance (higher recovery for given oxygen purity) was unexpectedly achieved at 45° compared to 30° feed phase lag.

As in the above disclosed PSA systems, four-way directional spool valves could be used to supply feed and withdraw waste gas from a set of four beds. The spool valves control flows from a feed compressor and to an exhaust vacuum pump exactly as in FIGS. 1 or 2, and each connected in sequence to each adsorbent bed for ¼ of the cycle period.

FIG. 5

Within the practicable cycle frequency limitation of granular adsorbent (e.g. not much more than 10 cycles per minute without significant axial adsorbent bed pressure drops and associated bed attrition problems), the expansion pistons become excessively large, so that the embodiment of FIG. 1 would only be attractive for extremely energy-sensitive applications (e.g. 12 volt DC power) while that of FIG. 3 would most likely apply only to manually powered emergency life support devices.

In order to achieve high frequency operation, conventional granular adsorbent packed beds must be replaced with a high surface area adsorbent support monolith, so that much higher cycle frequencies become possible. That solution is illustrated in embodiments below described.

The present invention includes the use of adsorber elements (replacing conventional packed adsorbent beds) formed of layered or laminated sheet material, using fibre reinforcement to support a zeolite loaded composite in "adsorbent sheets". Alternative fibrous reinforcement materials may be based on glass, mineral, carbon or kevlar fibres, with either long or short fibres. The sheets are thin enough to provide high surface area. Proprietary spacers provide accurately defined gas flow channels between the adsorbent sheets. The direction of flow is tangential to the adsorbent sheets and within the channels between adjacent pairs of adsorbent sheets.

Layered adsorber (or "adsorbent laminate") elements may be made in the form of rectangular books, with flow between the sheets parallel to one edge, as in experimental samples currently under test. Other configurations disclosed herein include spirally rolled elements with axial flow, and elements made by stacking annular discs with radial flow between the discs.

At the present stage of development, experimental adsorbent laminate elements have operated in a PSA unit generating high purity oxygen at 100 cycles/minute. With minor refinements and greater control of tolerances, cycle frequencies are projected to extend up to about 600 cycles/minute, consistent with reciprocation of the double-acting feed/exhaust pistons of FIG. 2 at 1200 RPM. Because the adsorbent laminate technology will enable very high cycling rates, it promises to achieve radical miniaturization of the TCPSA equipment.

Embodiment 300 is an oxygen concentrator apparatus, with the adsorbent beds provided as spiral rolls of adsorbent sheet material in each expansion piston. As in apparatus 120 of FIG. 4, double-acting feed/exhaust cylinders 121 and 122 provide the combined feed compressor and exhaust vacuum pump functions. Feed/exhaust cylinder 121 includes a feed chamber 123 and an exhaust chamber 124, separated by piston 125 on piston rod 126 reciprocating within cylinder 121. Likewise, identical feed/exhaust cylinder 122 includes a feed chamber 133 and an exhaust chamber 134, separated by piston 135 on piston rod 136 reciprocating within cylinder 122.

Inlet check valves 140 and 141 are provided to admit feed flow from inlets 142 and 143 to feed chambers 123 and 133 respectively. Exhaust check valves 144 and 145 are provided to discharge exhaust flow from exhaust chambers 123 and 133 respectively.

Piston 125, piston rod 126, piston 135 and piston rod 136 are reciprocated by scotch yoke 301. Rotary crank 302 is driven by motor 303 to rotate around axis 304, and is engaged with scotch yoke 301 by bearing sleeve 305.

The shaft of motor 303 is coupled by a linkage 310 to gearbox 311 whose gear ratio is 2:1. Gearbox 311 is coupled to expansion crankshaft 312, supported by bearings 313 and 314, so that rotary crank 302 rotates at exactly twice the rotary speed of expansion crankshaft 312. The relative angular phase between crankshaft 312 and crank 302 is determined by the coupling between linkage 310 and gearbox 311, while the feed/exhaust cylinders reciprocate at twice the PSA cycle frequency.

Expansion crankshaft 312 has four crank throws 315, 316, 317 and 318 phased 90° apart. Each crank throw (315, 316, 317 and 318) is coupled by a connecting rod 320 and pin 321 to an expansion piston 325, 326, 327 and 328 reciprocating respectively in an expansion cylinder 330, 331, 332 and 333.

The pistons respectively define expansion spaces 335, 336, 337 and 338 in their expansion cylinders. At the moment depicted, piston 325 is near its bottom dead centre position for maximum expansion of space 335, piston 326 is advancing as indicated by arrow 340 to contract space 336, piston 327 is near its top dead centre position to minimize the volume of space 337, and piston 328 is retracting as indicated by arrow 341 to expand space 338.

Each expansion piston (e.g. typical piston 325) reciprocates in its cylinder 330 with effective sealing by a narrow clearance gap between cylinder 330 and piston sealing wall 350 which have a mutual sealing contact. This gap is so narrow as to minimize leakage between piston 325 and the cylinder wall, which are respectively fabricated of suitable materials (e.g. ceramics or hardened steel alloys) for low wear and low friction without external lubrication. The piston 325 is also configured to function as a 3-way valve for feed and exhaust of the adsorbent bed supported on that piston. A feed conduit 351 in the piston 325 communicates to valve port 352 opening through the sealing wall 350 of piston 325 providing a reciprocal clearance seal to cylinder 330. Cylinder 330 has a feed port 354 and an exhaust port 355 which become aligned for fluid communication with valve port 352 at respectively the top dead centre and bottom dead centre positions of the piston. Valve port 352 is completely closed to both of the feed port 354 and the exhaust port 355 when the piston is midway between its top and bottom dead centre positions.

In this embodiment, the adsorbent bed element is installed within the expansion piston whose wall forms a sealing contact within the expansion cylinder, with the adsorbent bed second end communicating to the expansion chamber and the adsorbent bed first end communicating to a valve port through the wall of the expansion piston, and the expansion cylinder wall having a feed port communicating to the feed supply means and an exhaust port communicating to the exhaust means, such that the valve port is open to the feed port and the exhaust port is closed when the expansion piston is at or near its top dead centre position, the valve port is open to the exhaust port and the feed port is closed when the expansion piston is at or near its bottom dead centre position, and the valve port, feed port and exhaust port are all closed to fluid flow when the expansion piston is at or near an intermediate position between its top and bottom dead centre positions.

The adsorbent bed (or "adsorber element") on typical expansion piston 325 is provided as a spiral roll 359 of adsorbent loaded sheet material forming layers 360 and wound around a core mandrel 361. The adsorbent material may be provided as a coating on one or both sides of an inert support material such as an aluminum foil, or may be provided in a composite matrix of adsorbent with fibrous reinforcement and a suitable binder. The layers 360 are spaced apart to establish narrow and substantially identical flow channels 362 between each adjacent pair of layers 360, so that gas flow at substantially uniform velocity takes place on both sides of each layer 360. The spiral roll 359 is contained in a housing 365 integral with piston 325, and may also be retained by a central bolt 366 through core mandrel 361. The adsorbent bed has a first end 367 communicating with feed plenum 368 which in turn communicates to feed conduit 351, and a second end 369 directly communicating with expansion space 335. The flow channels 362 define a flow path between the first and second ends of the adsorbent bed, contacting the adsorbent material. A more detailed description of this type of adsorbent bed is provided in FIG. 7.

Feed chamber 123 is connected by conduit 375 to feed port 354 of cylinder 330 and by conduit 376 to feed port 377 of cylinder 332. Feed chamber 133 is connected by conduit 378 to feed port 379 of cylinder 331 and by conduit 380 to feed port 381 of cylinder 333. Exhaust chamber 124 is connected by conduit 382 to exhaust port 355 of cylinder 330 and by conduit 383 to exhaust port 384 of cylinder 332. Exhaust chamber 134 is connected by conduit 385 to exhaust port 386 of cylinder 331 and by conduit 386 to exhaust port 387 of cylinder 333.

Product gas is delivered by check valves 388, 389, 390 and 391, from expansion chambers 335, 336, 337 and 338 respectively, into product delivery manifold 392. The product gas flows from manifold 392 into receiver 393, which includes cooperating pressure and/or flow control means to establish the pressure of the product gas at a product delivery pressure just below the higher pressure $P_H$ of the PSA cycle.

When the feed/exhaust pistons 125 and 135 are stroking in the direction indicated by arrow 394, feed chamber 133 is inducting feed air from inlet 143 as indicated by arrow 395, while exhaust chamber 134 is expelling exhaust gas from the apparatus as indicated by arrow 396. As indicated by arrow 396, feed chamber 123 is delivering compressed feed gas by conduit 376 and feed port 377 to the adsorbent bed of expansion cylinder 332, from which product gas is then delivered through check valve 390. As indicated by arrow 397, exhaust chamber 124 is extracting exhaust gas by conduit 382 and exhaust port 355 from adsorbent bed 359 of expansion cylinder 330. Simultaneously, the pressure is being increased by "product pressurization" of the adsorbent bed in expansion cylinder 331 by the motion of piston 326, while the pressure is being reduced by "cocurrent blowdown" of the adsorbent bed in expansion cylinder 333 by the motion of piston 328.

FIG. 6

Embodiment 400 is an oxygen concentration apparatus with provision for partial powering by waste heat, and with the adsorbent beds provided as stacks of adsorbent loaded annular discs.

The feed blower and vacuum exhaust functions are provided again by double-acting feed/exhaust cylinders, as in embodiment 300. Here the four adsorbent beds 401, 402, 403 and 404 are mounted in opposed pairs in vessels 405 and 406 which also serve as double-acting expansion cylinders.

Typical adsorbent bed 401 is provided as a stack of thin annular discs 410 supporting adsorbent material. The discs may be made of an inert sheet material coated on both sides with the adsorbent, or may be made as a composite of the adsorbent with a fibrous reinforcement and suitable binder to form a porous matrix. The discs 410 are spaced apart, by an equal distance between each adjacent pair of discs, to define flow channels 411. The flow direction in channels 411 will be substantially radial. A feed flow distributor 412 (e.g. a cylindrical screen or filter of a porous sintered material) may be provided to enclose the stack of discs just outside their outer diameter. Similarly, a product flow distributor 413 (e.g.a cylindrical screen or filter of a porous sintered material) may be provided within the stack of discs just inside their inner diameter. A flow path through the adsorbent bed is defined radially by the channels 411 communicating between the feed and product flow distributors. The flow distributors 412 and 413 will create a modest pressure drop and will ensure improved uniformity of flow distribution through this adsorbent bed, both axially and circumferentially. The stack of adsorbent discs 410 in bed 401 is clamped between a front plate 414 and a back plate 415. The adsorbent bed has a product plenum 416 inside product flow distributor 413, through which a central bolt 417 may be installed. The adsorbent bed also has a feed plenum 418 outside feed flow product distributor 412 and within the adjoining portion of vessel 405 up to back plate 415.

Adsorbent beds 401 and 403 are installed in opposite ends of vessel 405. An expansion piston 420 with seal 421 defines expansion chambers 422 and 423 in cylinder 424, which is the central portion of vessel 405. Expansion chamber 422 cooperates with bed 401, and chamber 423 similarly cooperates with adsorbent bed 403. Adsorbent beds 402 and 404 are installed in opposite ends of vessel 406.

A product flow passage 425 provides fluid communication between expansion chamber 422 and product plenum 416 of adjacent adsorbent bed 401. Heater coils 426 are provided in passage 425, with externally heated heat exchange fluid circulated into the coils as indicated by arrow 427 and out of the coils as indicated by arrow 428. Baffles 429 are provided to constrain the flow in passage 425 to follow coils 426, so that the product gas contacts the coil in countercurrent flow to the heat exchange fluid when flowing from the product plenum 416 to the expansion space 423, and in cocurrent flow to the heat exchange fluid when flowing from the expansion space 422 to the product plenum 416. Hence, product gas entering the expansion space will be heated to a temperature $T_E$ approaching the temperature to which heat exchange fluid entering the heater coil has been heated. A regenerative heat exchange matrix may also be included within flow passage 426, so that the temperature in expansion space 422 may be further elevated with respect to the temperature of the adsorbent bed. Back plate 415 is shown in solid black, and incorporates thermal insulation to isolate the adsorbent bed from heater coil 426. Back plate 415 contacts the inner wall of vessel 405 in sealing engagement, so as to prevent leakage between the feed plenum 418 and product flow passage 425.

An expansion piston 430 with seal 431 defines expansion chambers 433 and 434 in cylinder 435, which is the central portion of vessel 406. Expansion chamber 433 cooperates with bed 402, and chamber 434 similarly cooperates with adsorbent bed 404.

Product gas is delivered from the product plenums 416 and product flow passages 425 of beds 401, 402, 403 and 404 by check valves 436, 437, 438 and 439 to product receiver and pressure control means 393.

Pistons 420 and 430 are reciprocated by piston rods 440 and 441, in turn driven by rotating crank throws 442 and 443 of crankshaft 444 through connecting rods 445 and 446. Crankshaft 444 is supported by bearings 447, 448 and 449; and is connected by coupling 450 and linkage 451 to gearbox 452 and by linkage 453 to motor 303. Gearbox 452 establishes the rotating speed of crankshaft 444 to be exactly ½ the rotating speed of crank 302 driving the feed/exhaust pistons. The coupling and linkage also establish the phase relationship between crank 302 and crankshaft 444. Crankshaft 444 rotates at the cycle frequency of the PSA process.

Feed gas compressed in feed chamber 123 enters conduit 460 and cooler 461 to remove heat of compression, and enters feed port 462 of 4-way rotary valve 463. Exhaust gas is drawn from exhaust port 464 of rotary valve 463 into conduit 465 and exhaust chamber 124. Rotary valve 463 includes a barrel rotor 466 rotating counterclockwise with a narrow clearance in stator 467. The stator has feed port 462 and exhaust port 464 in 180° opposed positions, and two bed ports 470 and 471 in the opposed positions 90° offset from the feed and exhaust port. Bed port 470 communicates by conduit 472 and optional heat exchanger 473 to the feed plenum of bed 401. Bed port 471 communicates by conduit 474 and optional heat exchanger 475 to the feed plenum of bed 403. Valve channels 476 and 477 in rotor 466 connect pairs of stator ports 90° apart. At the moment shown, channel 476 connects bed port 470 to exhaust port 464, and channel 477 connects feed port 462 to bed port 471.

Feed gas compressed in feed chamber 133 enters conduit 480 and cooler 481 to remove heat of compression, and enters feed port 482 of 4-way rotary valve 483. Exhaust gas is drawn from exhaust port 484 of rotary valve 483 into conduit 485 and exhaust chamber 134. Rotary valve 483 includes a barrel rotor 486 rotating counterclockwise with a narrow clearance in stator 487. The stator has feed port 482 and exhaust port 484 in 180° opposed positions, and two bed ports 490 and 491 in the opposed positions 90° offset from the feed and exhaust port. Bed port 490 communicates by conduit 492 and optional heat exchanger 493 to the feed plenum of bed 404. Bed port 491 communicates by conduit 494 and optional heat exchanger 495 to the feed plenum of bed 402. Valve channels 496 and 497 in rotor 486 connect pairs of stator ports 90° apart. At the moment shown, channels 496 and 497 are closed as the valve rotates between an intermediate closed position while feed chamber 133 inducts fresh feed gas and exhaust chamber 134 expels exhaust gas.

Figure 6:
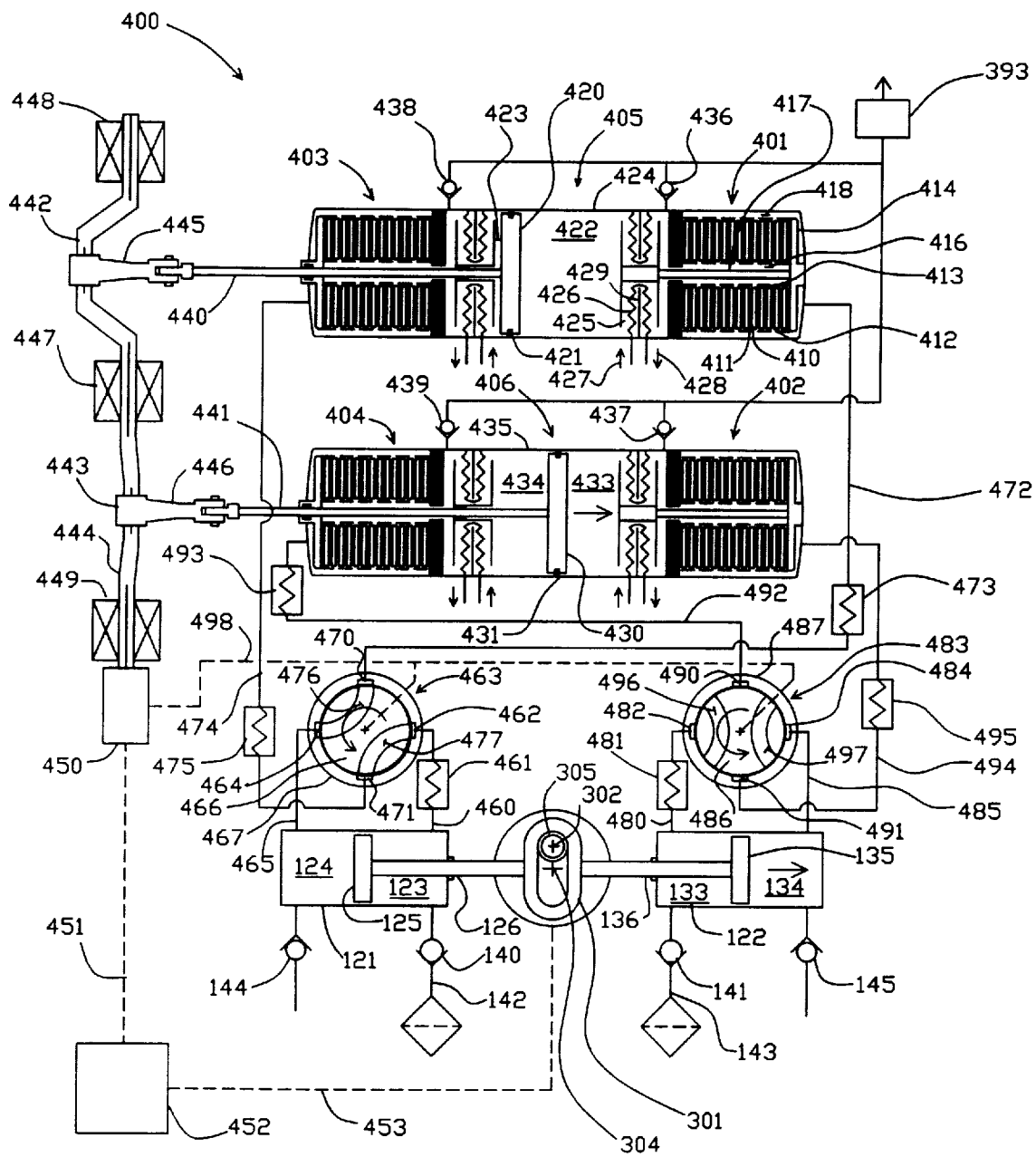
FIG. 6 shows an oxygen concentration apparatus with provision for partial powering by waste heat, and with the adsorbent beds provided as stacks of adsorbent loaded annular discs.

Valve rotors 466 and 486 are driven by a rotary linkage 498 connected to coupling 450, so that the valves rotate at the cyclic frequency of the PSA process, equal to the rotary frequency of crankshaft 444, and with the phase relation indicated by FIG. 6. Valves 463 and 483 may be integrated into a single unit combining rotors 466 and 486.

FIG. 7

Embodiment 500 is an oxygen concentration apparatus with cam actuated feed and exhaust poppet valves, and with a rotary distributor valve for reflux of oxygen concentrated gas at the product ends of the four adsorbent beds 501, 502, 503 and 504.

At their product ends, the four beds are connected to a rotary distributor valve controlling "light reflux" functions of pressure equalization, cocurrent blowdown, and light reflux pressurization. This distributor valve is connected to the beds, and allows oxygen enriched air to flow between pairs of beds for each equalization, cocurrent blowdown and light reflux pressurization step. The valve rotor and a rotary cam for actuating the spool valves are driven by the same shaft.

As with the above TCPSA systems, power consumption is reduced since the compressor and vacuum pump each "ride" the adsorbent bed for respectively feed pressurization and countercurrent blowdown steps. Again, the average working pressure across each of the compressor and vacuum pump is less than the maximum working pressure.

This advanced PSA system lacks the expansion pistons of the TCPSA energy recovery system, so cannot achieve the highest possible energy efficiency. However, the rotary valve is more compact and less costly than the TCPSA expansion pistons.

A "light" rotary distributor valve is used at the product end of the beds to provide the "light reflux" functions of pressure equalization [one or two equalization steps in valves tested to date], cocurrent blowdown, and product repressurization. Auxiliary flow controls are provided for trimming the system, and to enable a self-regulated turn-down control mode.

This system achieves high product recovery in a very simple mechanical format. Since the equalization step is performed at the product end so that there is no recycling of humid exhaust gas back to the adsorbent beds, water vapour in the exhaust gas is positively discharged to minimize risks of adsorbent deactivation.

Each adsorbent bed comprises a roll of adsorbent loaded sheet material 505 spaced apart to define flow channels between adjacent layers of the roll. The flow channels have a first end defined by a feed plenum 506, and a second end defined by a product plenum 507. The adsorbent between the feed plenum and an intermediate boundary 508 within the bed is provided as a desiccant such as alumina, and the adsorbent between boundary 508 and the product plenum is a nitrogen-selective zeolite such as Ca-X.

The apparatus is driven by motor 510, coupled by shaft 511 to blower crank 512 and vacuum pump crank 513. Cranks 512 and 513 both rotate at the rotary speed of shaft 511, which is exactly twice the PSA cycle frequency. Blower crank 512 reciprocates scotch yoke 516, in turn reciprocating feed piston 519 in cylinder 520 and feed piston 521 in cylinder 522. Vacuum pump crank 513 reciprocates scotch yoke 523, in turn reciprocating exhaust piston 526 in cylinder 527 and exhaust piston 528 in cylinder 529.

Feed cylinder 520 inducts feed air from inlet 530 and suction check valve 531, and delivers feed air by conduit 532 to inlet poppet valve 533 connected to the feed plenum 506 of bed 501 by conduit 534. Conduit 534 also delivers exhaust gas from feed plenum 506 to exhaust poppet valve 535, which when open delivers exhaust gas by conduit 536 to exhaust cylinder 527. Exhaust gas is discharged from cylinder 527 by exhaust check valve 537. Feed cylinder 520 likewise delivers feed gas to bed 503 through inlet poppet valve 540, while exhaust cylinder 527 receives exhaust gas from bed 503 from exhaust poppet valve 541. Similarly, feed cylinder 522 delivers feed gas to bed 502 through inlet poppet valve 543 and to bed 504 through inlet poppet valve 544, while exhaust cylinder 529 receives exhaust gas from bed 502 from exhaust poppet valve 545 and from bed 504 from exhaust poppet valve 546.

The inlet and exhaust poppet valves are installed within valve block 550. Each poppet valve is actuated by a valve stem 551 with a stem seal 552. Each valve stem 551 is lifted by a roller 553, acting against a compression spring 554 keeping the poppet valve normally closed. The rollers 553 run against rotary cams 555 on camshaft 556, which is supported by bearings 557 and 558. At the instant depicted, inlet poppet valve 544 is open to admit feed gas into bed 504 from feed cylinder 522 whose piston is advancing as shown by arrow 560, and exhaust poppet valve 545 is open to exhaust cylinder 522 whose piston is retracting as shown by arrow 561.

Motor 510 drives camshaft 556 through gearbox 565, shaft 566 and coupling 567 establishing the rotary speed of the camshaft to be equal to the PSA cycle frequency, or half the rotary speed of cranks 512 and 513. Gearbox 565 and shaft 568 also drives the rotor 570 of light reflux rotary valve 571. Rotor 570 is a cylindrical barrel which rotates within stator 572 with a narrow sealing gap 573 to minimize leakage, wear and friction. Leakage is further minimized by a shaft seal on shaft 568 driving rotor 570. The stator has four bed ports 574, 575, 576 and 577 spaced 90° apart, and communicating by conduits 578, 579, 580 and 581 to the product plenums respectively of beds 501, 502, 503 and 504. The rotor has six function ports defined by the paired ends of three reflux passages 585, 586 and 587. Passages 585 and 587 connect pairs of beds separated by 90° phase, while passage 586 connects pairs of beds separated by 180° phase. Reflux passage 585 provides a product pressurization step bringing a bed up to the higher working pressure. Reflux passage 586 provides a pressure equalization step in which one bed depressurizes from a higher pressure to bring another bed up from the lowest working pressure. Reflux passage 587 provides a cocurrent blowdown to purge step, in which one bed depressurizes further after depressurizing in the equalization step, while providing light product gas to purge another bed at the lowest pressure.

Product gas may be delivered from reflux passage 585 by optional port 588 communicating to a product plenum in stator 572. Alternatively, product gas may be delivered by product check valves 590, 591, 592 and 593 accepting product gas at substantially the higher working pressure from conduits 578, 579, 580 and 581. The product check valves deliver product gas to a receiver 595, which includes cooperating means to establish the product delivery pressure to that the product check valves only open when the pressure in the bed corresponding to each product check valve is sufficiently high.

An important feature of embodiment 500 is the use of a rotary multiport distributor valve to reflux light product gas (e.g. concentrated in the less strongly adsorbed or light fraction, and depleted in the more strongly adsorbed or heavy fraction) from the product end of each bed to the product end of another bed for the steps of pressure equalization, cocurrent blowdown, purge and product pressurization. This feature is novel for a PSA apparatus which is not using a multiport distributor valve for controlling feed admission and heavy fraction exhaust at the feed ends of the adsorbent beds.

Another feature of embodiment 500 is the freedom to adjust the relative phase of light reflux valve 571, camshaft 556, and separately the feed pistons and the vacuum exhaust pistons, in order to optimize and adjust the cycle.

FIG. 8

Figure 7:
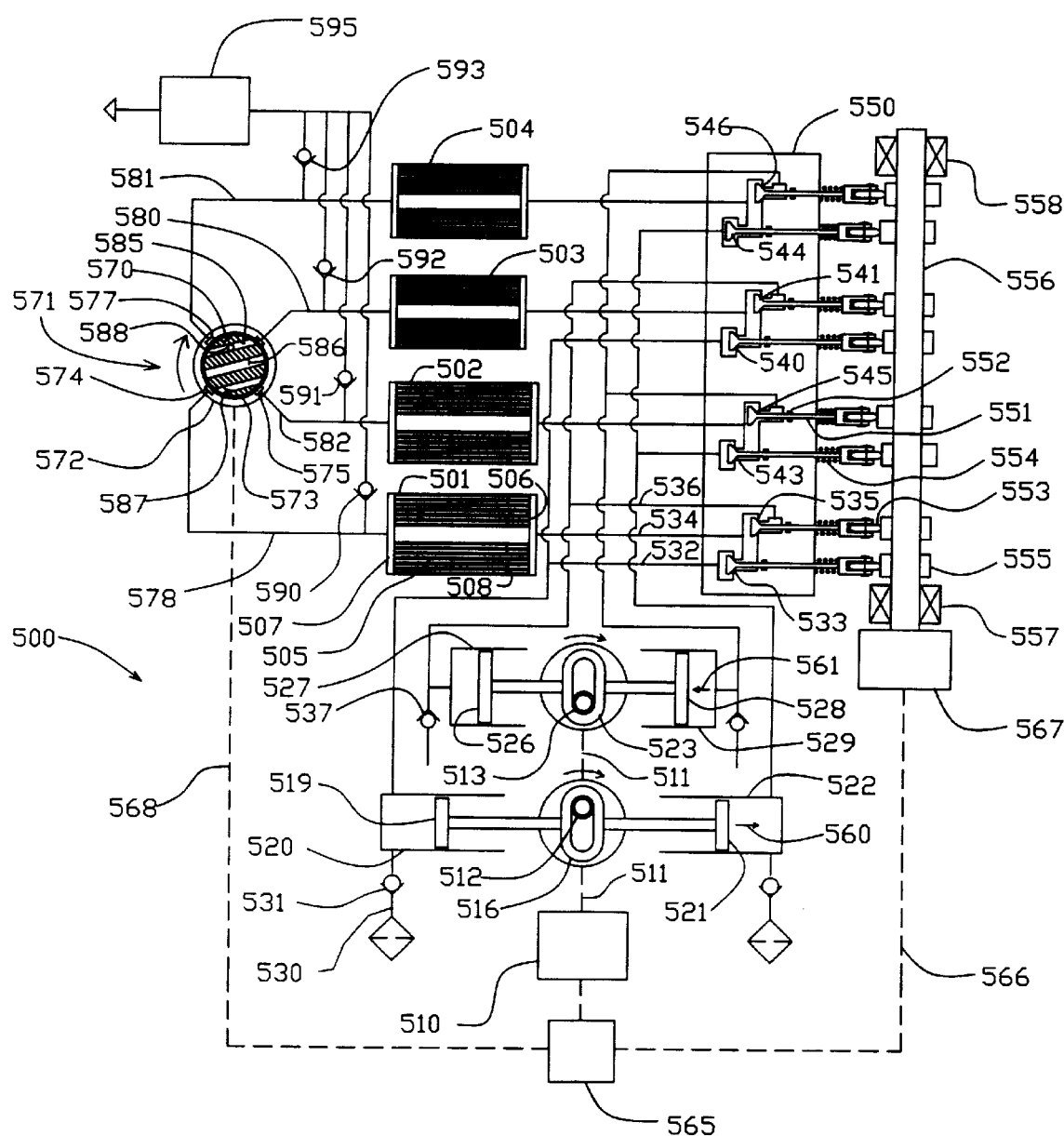
FIG. 7 shows an oxygen concentration apparatus with cam actuated feed and exhaust poppet valves, and with a rotary distributor valve for reflux of oxygen concentrated gas at the product ends of the four adsorbent beds.
Figure 8:
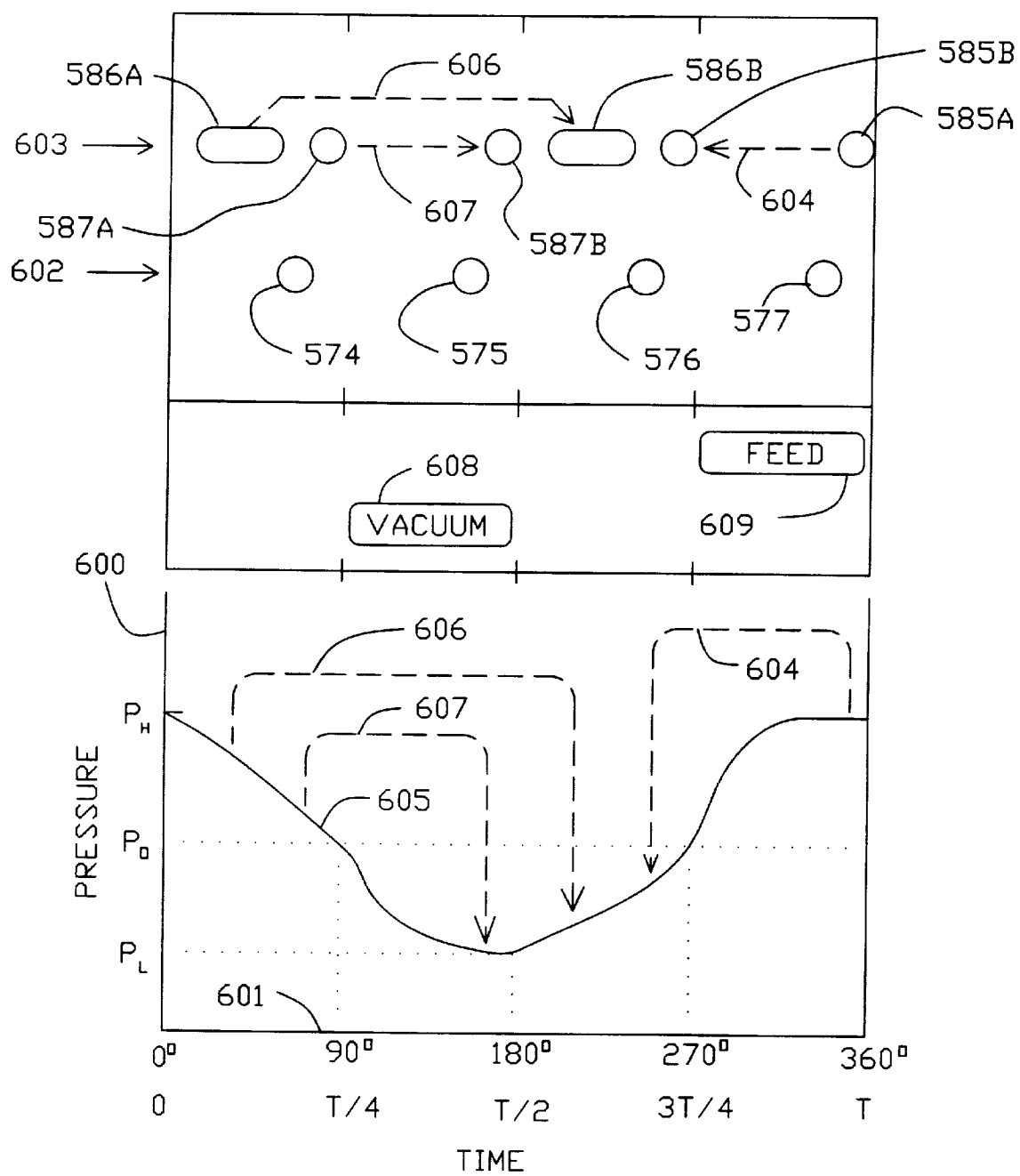
FIG. 8 shows the PSA cycle for the apparatus of FIG. 7.

FIG. 8 shows the PSA cycle for the apparatus of FIG. 7, with vertical pressure axis 600 versus time or phase axis 601. Time is expressed as angle of phase over a complete cycle, so that the cycle period corresponds to 360°.

The upper portion of the diagram shows the valve timing, versus phase angle or time. The bed ports of stator 573 in apparatus 500 are shown in row 602, and the function ports are shown in row 603. Function ports 585A and 585B are respectively the entrance and exit of passage 585, for performing product pressurization as shown by arrow 604 on pressure curve 605. Function ports 586A and 586B are respectively the entrance and exit of passage 586, for performing pressure equalization as shown by arrow 606. Function ports 587A and 587B are respectively the entrance and exit of passage 587, for performing cocurrent blowdown to purge as shown by arrow 607. The relative position of the bed ports and function ports corresponds to the instant depicted in FIG. 7.

Bar 608 shows the exhaust time interval during which an exhaust poppet valve 545 is opened for countercurrent blowdown and exhaust of a bed 502. Bar 609 shows the feed time interval during which an inlet poppet valve 544 is opened for feed pressurization and high pressure feed of a bed 504. Referring to FIG. 8, the process time intervals are cocurrent blowdown from 0° to 90°, exhaust from 90° to 180°, light reflux pressurization from 180° to 270°, and feed from 270° to 360° completing a cycle. The valve timing as described above will establish the pressure waveform 605 of a desirable vacuum pressure swing adsorption cycle. It will be evident that the timing as described above may be refined and modified to optimize the pressure ratio, specific adsorbent productivity, product recovery and product purity.

Figure 9A:
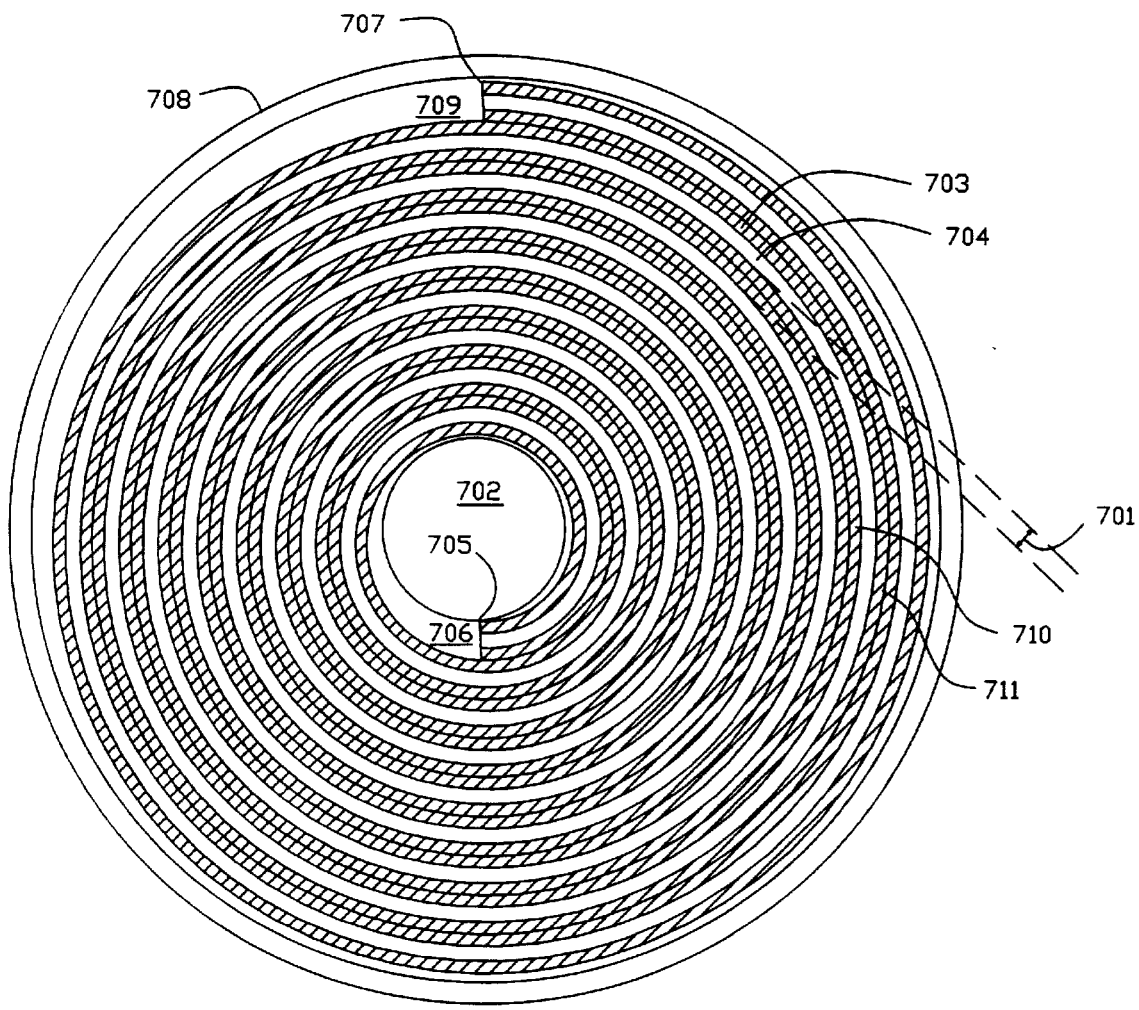
FIGS. 9A and 9B show alternative single leaf spiral roll adsorber elements.
Figure 9B:
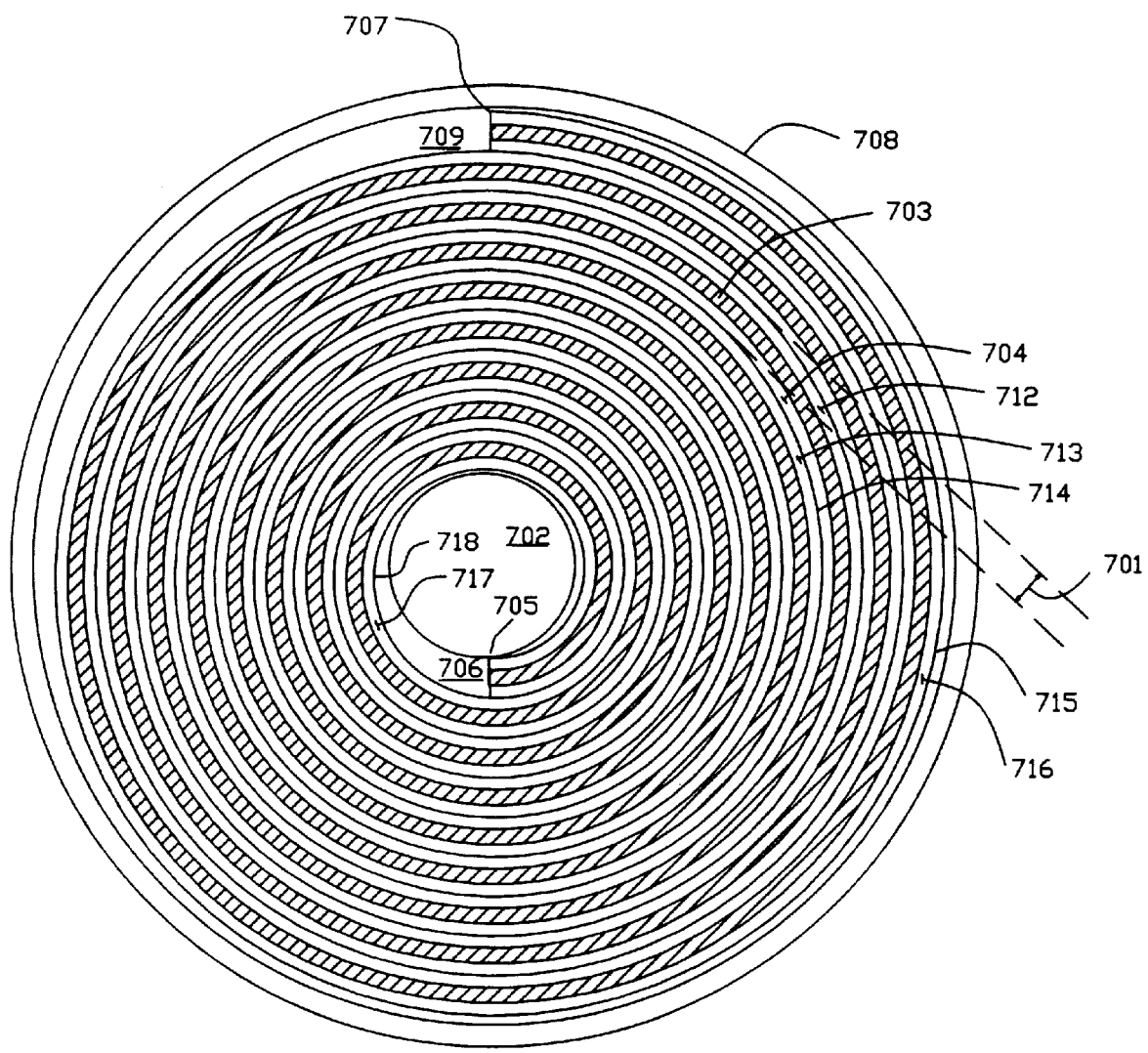

FIGS. 9A and 9B

Adsorbent bed modules may be made in the form of rectangular books, with flow between the sheets parallel to one edge, as in the experimental samples currently under test. Other configurations include spirally rolled modules with axial flow, and modules made by stacking annular discs with radial flow between the discs.

These and the following figures show layered adsorbent or adsorbent laminate configurations useful in high frequency PSA processes. In order to illustrate the inventive design concepts for such configurations, these figures are shown with greatly exaggerated thickness of the adsorbent layers and flow channels. Likewise, the aspect ratio between adsorbent layer or flow channel thickness, and flow channel length, is shown exaggerated by about two orders of magnitude. Similarly, spacer geometries are illustrated out of scale for clarity.

For air separation at a cycle frequency of 200 to 300 cycles per minute, based on equilibrium separation over a nitrogen-selective zeolite, the zeolite loaded adsorbent layer should be very thin, about 50 microns thick for a layer contacting flow channels on each side. Thickness of an adsorbent layer on an inert backing, and thus contacting the flow channels on one side only, should be about 25 microns. Width of the flow channels (contacting adsorbent layers on both sides) should also be about 25 microns. Flow channel length, between feed and product ends of the adsorbent element, should be several thousand times the flow channel width, or of the order of about 5 cm.

FIGS. 9A and 9B show cross sections of alternative single leaf spiral roll adsorbent elements, as used in embodiments 300 and 500 above.

The spiral roll adsorbent element 700 comprises one leaf or a plurality of leaves 701 rolled around a mandrel 702. Each leaf 701 is a sheet structure including at least one layer of adsorbent material 703 and at least one flow channel 704 defined by spacers within the leaf. The leaf may also contain one or more layers of inert material, which may be structural support material, thermal ballast material (e.g. metal), or impervious material (e.g. metal foil) to prevent fluid communication between adjacent layers.

Each leaf 701 is rolled from a start point 705 on mandrel 702. For a module with a number "M" of leaves rolled around a single mandrel, the start points will be spaced equally apart by an angle of [360°/M] between adjacent start points. Any voids 706 between the mandrel and the leaf start point(s) will be filled with an inert filler compound, e.g. silicone. Each leaf has an end point 707 on the outer diameter of the spiral roll. The roll is potted within a cylindrical housing or canister 708 by a suitable inert filler compound 709 such as silicone, filling voids between the roll, its end point(s) and the inner wall of the canister.

For oxygen concentration with a high frequency PSA cycle, nitrogen-selective zeolite adsorbents are preferred. The present invention has been demonstrated in rectangular test cells prepared with zeolite 13-X crystallite powder loaded onto a nonwoven scrim of long glass fibers. Satisfactory attachment was achieved with clay and silica binders preparatory to firing. Here, the layer of adsorbent material is the macroporous matrix of zeolite plus binder attached to inert glass fibers.

The adsorbent layer may also be provided as a thin coating of the zeolite material onto a metal foil, in turn constituting an inert thermal ballast layer.

For applications such as air purification, the adsorbent material 703 may be a self-supporting material such as activated carbon fibres or a microporous polymer in a woven or nonwoven matrix.

FIG. 9A shows a spiral roll module whose single leaf comprises two adsorbent layers 703 and 710 on either side of a single flow channel 704. An inert layer 711 (e.g. aluminum foil) may be provided on the outside of the leaf, or on both sides if the adsorbent is attached as a coating to the foil. The thermal mass of the aluminum foil would desirably isothermalize the adsorbent bed, damping undesirable temperature swings due to cyclic adsorption/desorption and pressure cycling. In FIG. 9A, each adsorbent layer contacts the flow channels on one side only of the adsorbent layer.

FIG. 9B shows a spiral roll whose single leaf comprises a single adsorbent layer 703, which contacts flow channels on both sides. The leaf includes spacers defining flow channels 704 and 712 on opposite sides of the adsorbent layer 703. If there is no impervious sheet separating adjacent layers of the roll, adjacent flow channels 704 and 713 (being the extension of channel 712) will in fact form a single flow channel of double width. Optionally, an impervious sheet 714 (e.g. aluminum foil, again providing desirable thermal inertia to damp temperature swings) may be applied to the outside of the leaf, maintaining the distinctness of flow channels 704 and 713. The spacers might then be formed by suitably embossing the foil 714. An impervious wrap 715 would be applied to the outside of the roll, to prevent ingress of potting compound into the flow channel 716. The innermost flow channel 717 would similarly be protected on surface 718.

The spiral roll embodiments depicted in FIGS. 9A and 9B both provide the desirable feature that the adsorbent layer and flow channels are substantially identical at all radial stations of the roll, including the innermost and outermost wraps. Otherwise, adverse effects on flow distribution would result from "wall effects" on the innermost and/or outermost wraps.

A major problem, solved in the present invention, arises from the unexpected flexibility and softness of a thin zeolite impregnated glass fiber scrim after firing.

It was feared that firing would embrittle the zeolite loaded scrim, which might warp and then fracture. However the structure retained its integrity and unexpectedly remained surprisingly flexible and compliant after firing. The organic sizing of the glass fibers is burnt off in firing, which may limit the extent of direct chemical bonding between glass fibers and the zeolite/binder matrix. The fibers and zeolite/binder matrix would be mechanically interlocked, with some freedom of relative movement before fiber fracture.

While the compliance and softness of the glass fiber reinforced zeolite adsorbent layer is very desirable in permitting mutual adjustment between adjacent layers to accommodate stacking errors, these properties create major difficulties in engineering spacer systems to establish narrow channels with extremely uniform geometry as required to minimize flow channelling. Attempts to provide spacers based on long parallel fibers or wires were unsatisfactory, because the flexible adsorbent layers would be unstable against bending and sagging between the spacers. A solution to stabilizing the spacer system is provided within the invention, as discussed hereunder.

Figure 10:
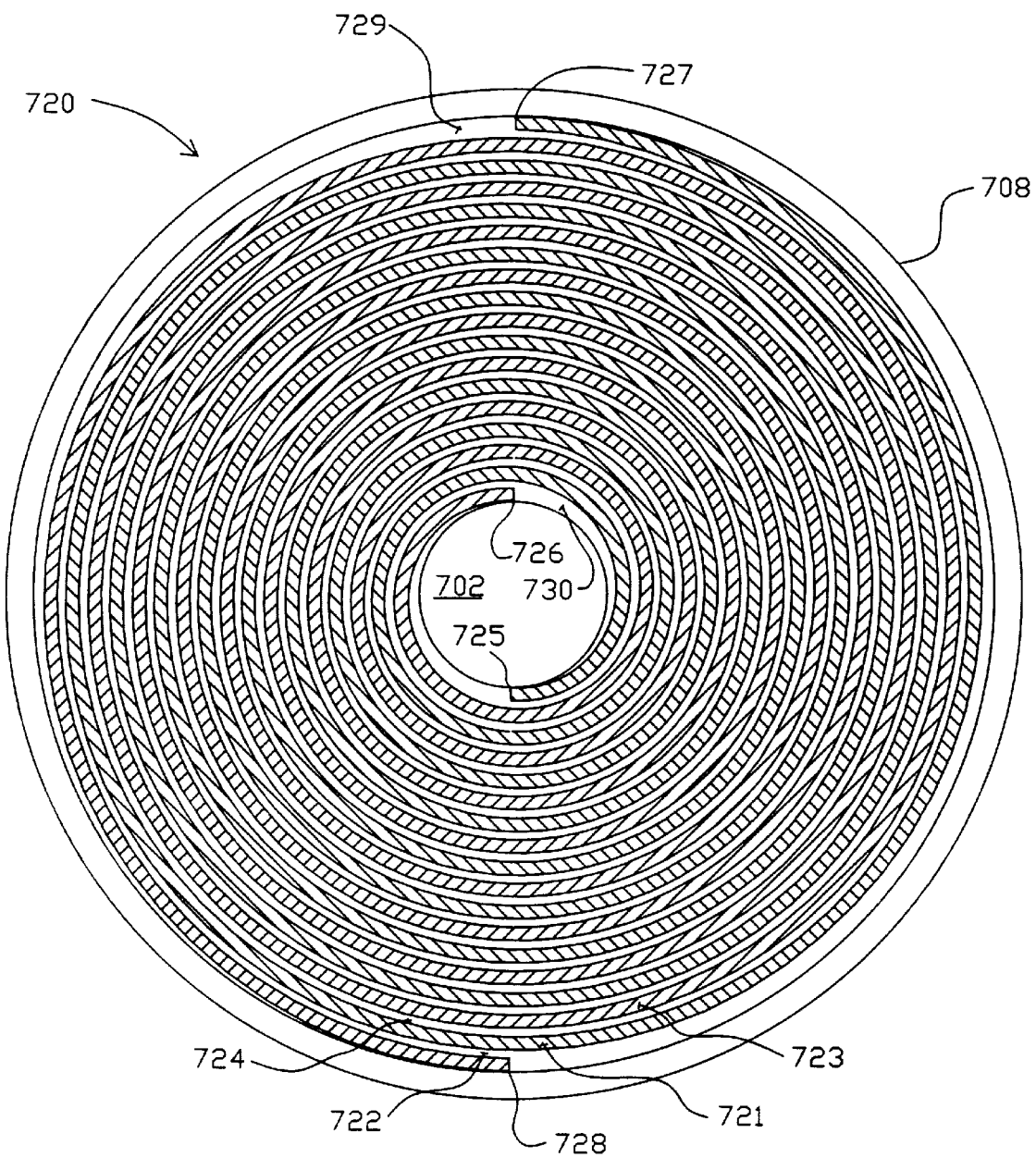
FIG. 10 shows a two leaf spiral roll adsorber element.
Figure 11:
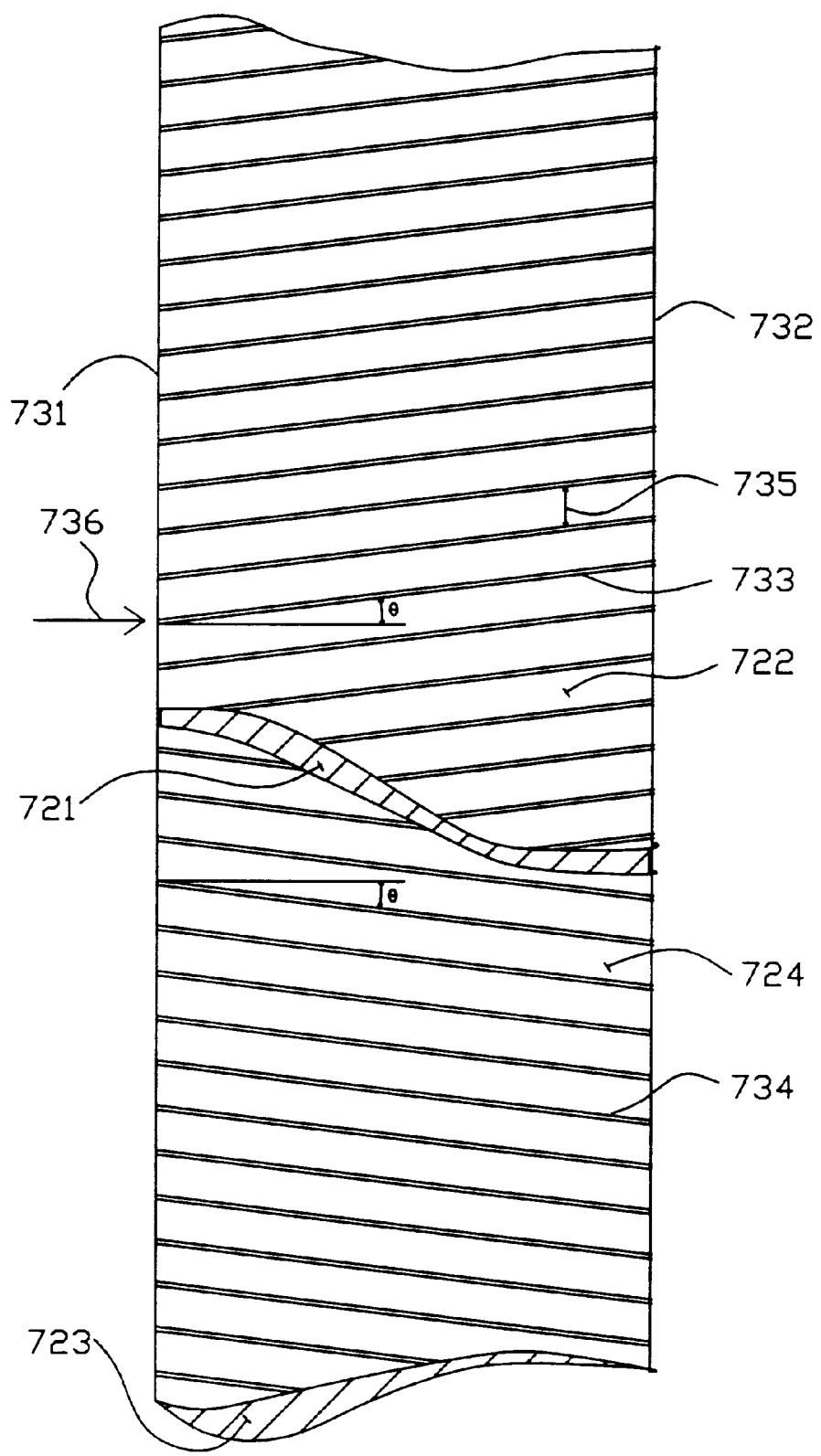
FIGS. 11, 12 and 13 show alternative spacer systems for the spiral rolls.

FIGS. 10 and 11

FIG. 10 shows a two leaf spiral roll adsorber element 720. First leaf including adsorbent sheet 721 with spacers defining flow channel 722, and second leaf including adsorbent sheet 723 with spacers defining flow channel 724 are wound about mandrel 702 from start points 725 and 726 respectively, 180° apart. Similarly, the first and second leaves respectively terminate at outer endpoints 727 and 728, also 180° apart within housing 708. Cavities 729 and 730 may be filled with potting compound, or another inert and impervious filler, to prevent bypass of the flow channels.

Here, the number of leaves is M=2. More generally, the adsorber element spiral roll is formed by rolling a plurality of leaves constituting a number "M" of leaves spirally about a cylindrical mandrel, each leaf being an adsorbent sheet with spacers, the spacers defining a radial separation between adjacent layers of the roll for flow channels, the adjacent layers being the adsorbent sheets of adjacent leaves, and the leaves being rolled from the mandrel with start points angularly spaced 360°/M apart.

FIG. 11 shows the leaves unrolled to illustrate a stabilized spacer system for the spiral rolls. The width of the leaves is equal to the axial length of the adsorber element between its first end 731 and its second end 732. Two adjacent spacer layers 722 and 724 are shown, respectively comprised of straight spacer fibres 733 and 734. In each spacer layer, the spacer fibres are parallel and equally separated by a transverse spacing distance 735 defined as "S". The flow channel height "h" is nominally equal to the diameter "d" or width of the fibres, in turn typically about half the total thickness of the active adsorbent layer in each leaf. The transverse spacing distance will typically be in the range of about four to about ten times the fiber diameter or width, while the axial length "L" of the adsorber element between first end 731 and second end 732 may be of the rough order of a thousand times greater than the flow channel height and fiber diameter or width.

The substantially axial flow direction from first to second ends of the spiral roll adsorber element is indicated by arrow 736, itself exactly parallel to the axis of the spiral roll defined by the central mandrel. If the spacer fibres in each spacer layer were precisely parallel, a spiral roll of soft and flexible adsorbent sheets would be unstable against bending deflections of the adsorbent sheets, resulting in uneven flow distribution as the adsorbent sheet may collapse into (or bulge away from) portions of the flow channels.

In the present invention, stabilization is achieved by skewing spacers 733 in spacer layer 722 leftward by a small angle "θ", and simultaneously skewing spacers 734 in spacer layer 724 rightward by a small angle "θ", relative to the axis of the spiral roll and the nominal flow direction defined by arrow 736. This spacer system provides stability against bending and crushing deflections of the adsorbent material in thin and flexible adsorbent sheets.

The spacers based on straight spacer fibers 740, skewed by a small angle "θ" from the axis of the spiral roll. The transverse spacing 735 between the fibers is chosen relative to angle "θ" to ensure that the fibers in each layer cross at least several fibers of the opposite skewed inclination in the adjacent layer. This oblique crossing of the fibers in adjacent layers stabilizes the entire roll against deflections that would cause uncontrolled variations in flow channel width.

The number "X" of oblique cross-overs may be estimated from $$X \sim (2L/S)(\tan \theta)$$

For an illustrative example, taking L=1000 h, S=10 h, and X=10, the skewing angle θ~3°. Hence, the flow channels in alternating layers are deflected by only a shallow angle from exactly axial, while being stabilized by the opposed skewed inclinations of their fibers.

FIG. 11 as described represents two leaves of FIG. 10, with the first leaf having spacer layer 722 on an adsorbent layer 721, and the second leaf having spacer layer 724 on an adsorbent layer 723. The two leaves are then wound around a single mandrel, with start points 180° apart. This concept may be extended to any even number "N" of leaves, with oppositely inclined spacer layers 722 and 724 on respectively odd and even leaves represented here by the first and second leaves of FIG. 11.

Each leaf might optionally be backed with an aluminum foil on one side or in the middle of each adsorbent sheet. The fibers 733 and 734 may be laid between the adsorbent sheets as the adsorber element is rolled, or may be bonded to the adsorbent sheets before they are rolled. Alternatively, the fibers may in fact be provided as raised ridges printed or embossed directly on the adsorbent sheets, of the adsorbent material and/or an inert material. Those raised ridges may be continuous or discontinuous, in the latter case becoming an array of bosses similar to the spacer pattern of FIG. 13 below. If the spacers are formed as closely spaced ridges of adsorbent material, the flow channels between them may be described as grooves in the adsorbent sheet, again defining an axis of symmetry to be skewed by a small angle.

This aspect of the invention may be recited as the number "M" of leaves being an even number, with the adjacent leaves alternatingly numbered as odd and even, and with first and second spacer patterns provided for the odd and even leaves, with each of the spacer patterns having an axis of symmetry, the first and second spacer patterns being oppositely skewed relative to the axis of the spiral roll so as to provide multiple oblique cross-overs of the first and second spacer patterns, and thus to stabilize the spiral roll against deflections that would degrade the uniformity of the flow channels.

The spacer stabilization principle of this invention may be expressed in many alternative embodiments. Most generally, the principle is to stabilize the spacer system by multiple oblique crossovers of first and second (or odd and even) overlapping spacer patterns, with each pattern characterized by an axis of symmetry which is skewed from the nominal flow direction parallel to the spiral roll axis by an equal and opposed skewing angle for the first and second (odd and even) patterns. In the example of FIG. 11, the spacer fibers themselves define the pattern in each spacer layer, with the fiber axes being an axis of symmetry in each layer.

The first and second (or odd and even) spacer patterns have been described above as being provided within first and second (or odd and even) leaves of the spiral roll. It is also possible as follows to provide a stabilizing embodiment for a single leaf roll, or for a multiple leaf roll with all leafs identical. Each adsorbent sheet would have a first spacer pattern on one side, and a second spacer pattern on the other side, with these two spacer patterns being oppositely skewed. The flow channels between adjacent adsorbent sheet layers (or leaves) in the roll would then be provided by the first pattern of one layer (or leaf) lying with stabilizing oblique crossovers on the second pattern of the adjacent layer (or leaf). Referring to FIG. 9B, its flow channels 704 and 713 would be defined under this stabilizing principle by skewed spacer patterns similar to spacer layers 722 and 724 in FIG. 11.

Figure 12:
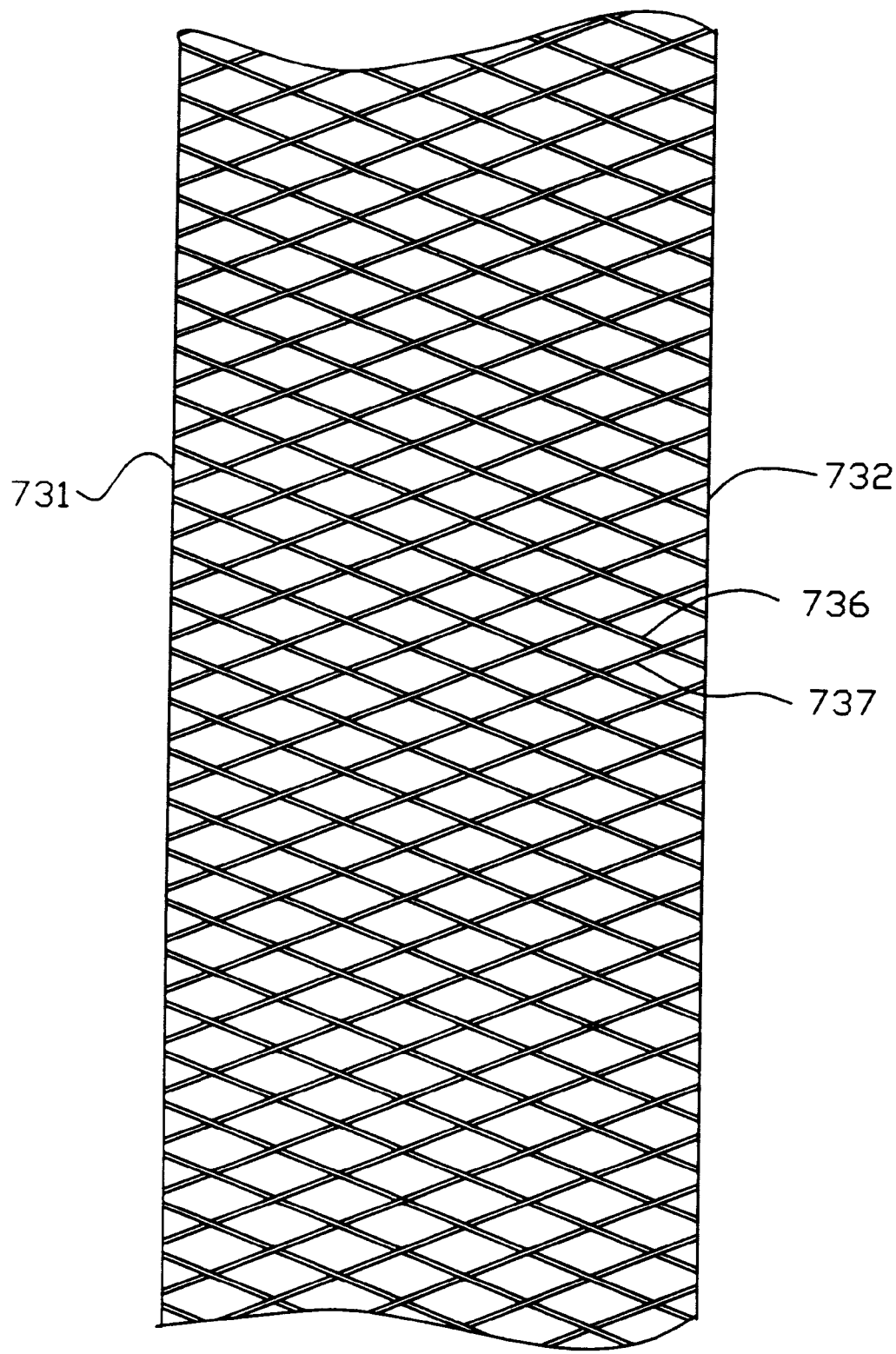
Figure 13:
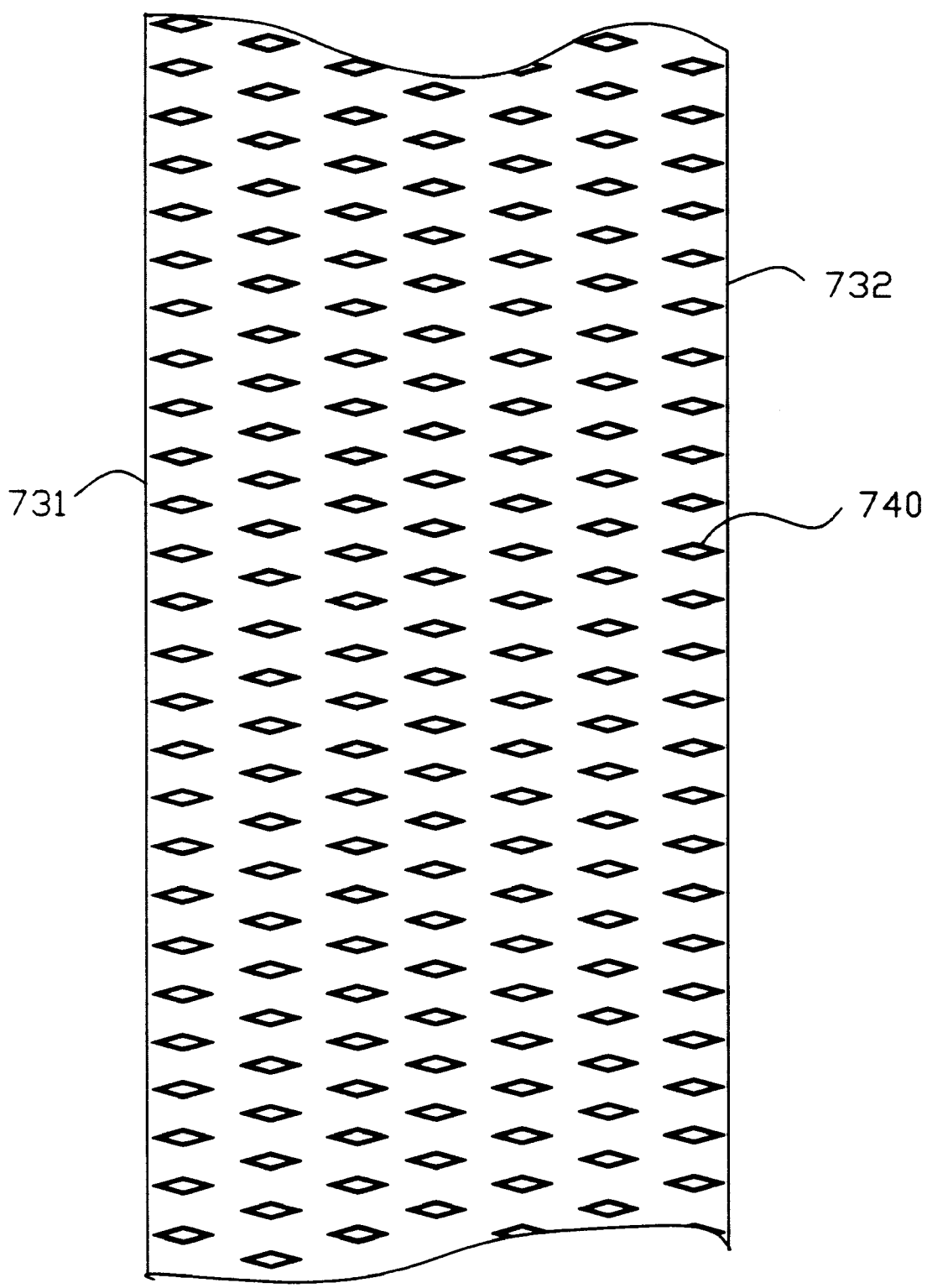

FIGS. 12 and 13

FIGS. 12 and 13 also show (for unrolled leaves) alternative spacer systems for the spiral rolls using thin and flexible adsorbent layers. These spacer systems seek to provide stability against bending and crushing deflections of the adsorbent material.

The spacers may be provided by inert fibres, metal wires (desirably providing thermal inertia), or twisted fibrous yarns which may be impregnated with adsorbent material.

FIG. 12 shows a woven spacer layer, comprising oppositely inclined fibers or wires 736 and 737 in a diagonally woven screen. To provide adequately stable spacing and also to minimize dispersion effects, the flow channel length should be a very large multiple of the screen weave pitch.

FIG. 13 shows the alternative of an embossed spacer system, established either by raising a pattern of elevated bosses 740 on the adsorbent layer, or by embossing an aluminum foil between two smooth adsorbent layers. The embossing pattern should be staggered as shown to ensure stability. Skewing the pattern between adjacent layers would further improve stability. Again, the flow channel length must be a large multiple of the longitudinal and axial pitch distances between bosses, in order to ensure stability while minimizing dispersion.

FIG. 14

Figure 14:
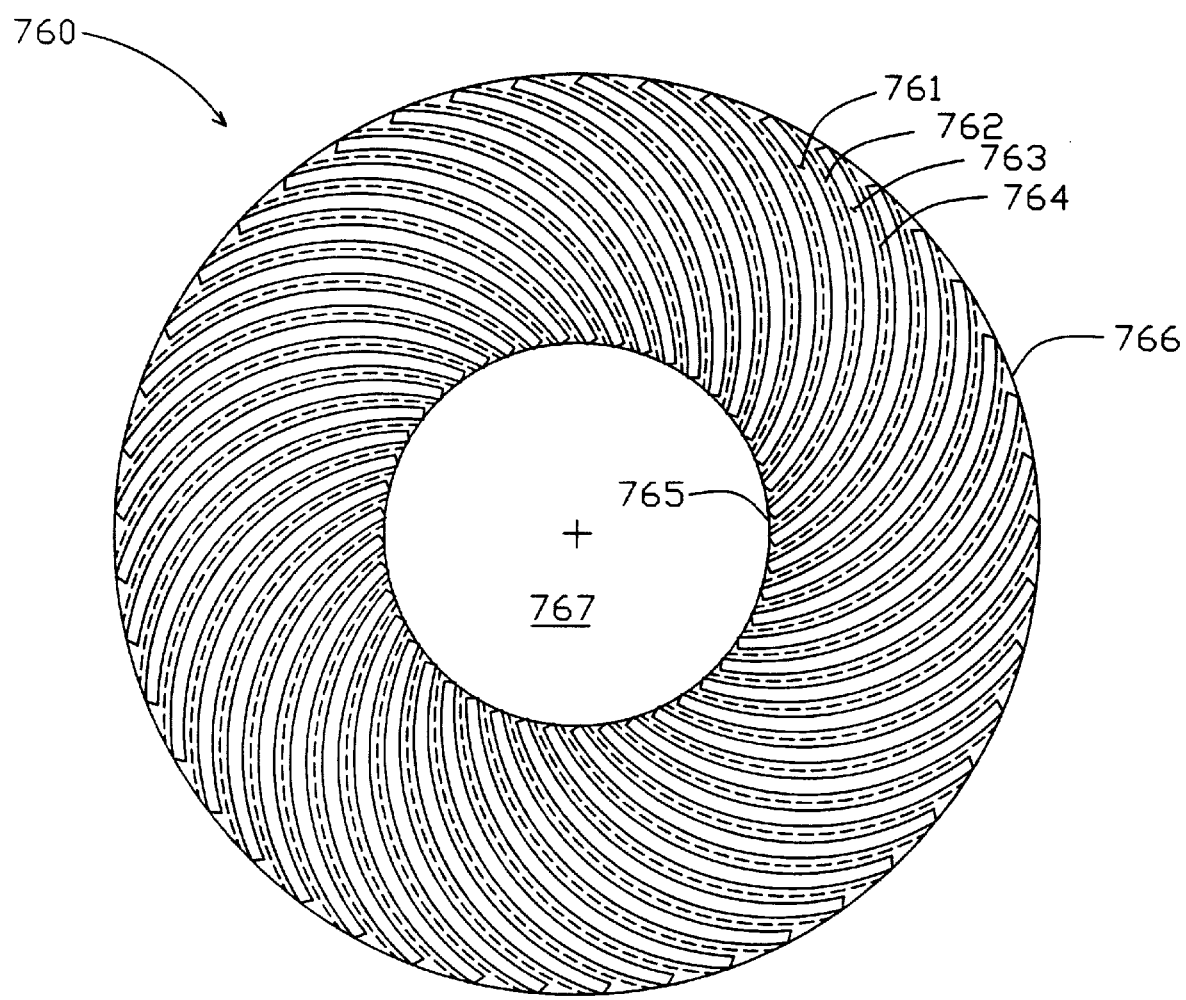
FIG. 14 shows a multiple leaf suitable for axial or radial flow.

FIG. 14 shows a multiple leaf spiral roll adsorbent element 760, suitable for axial or radial flow. Adjacent leaves include adsorbent layer 761 with flow channel defined by spacer 762, and adsorbent layer 763 with flow channel defined by spacer 764. Element 760 is rolled between an inner diameter 765 and an outer diameter 766.

The flow direction may be axial, in which case the inner diameter 765 is potted to a central core 767, while the outer diameter 766 is the inner wall of a canister. Alternatively, the flow direction may be radially along the spiral flow channels, with the outer diameter 766 defining a feed plenum, and the inner zone 767 being a product plenum.

Figure 15:
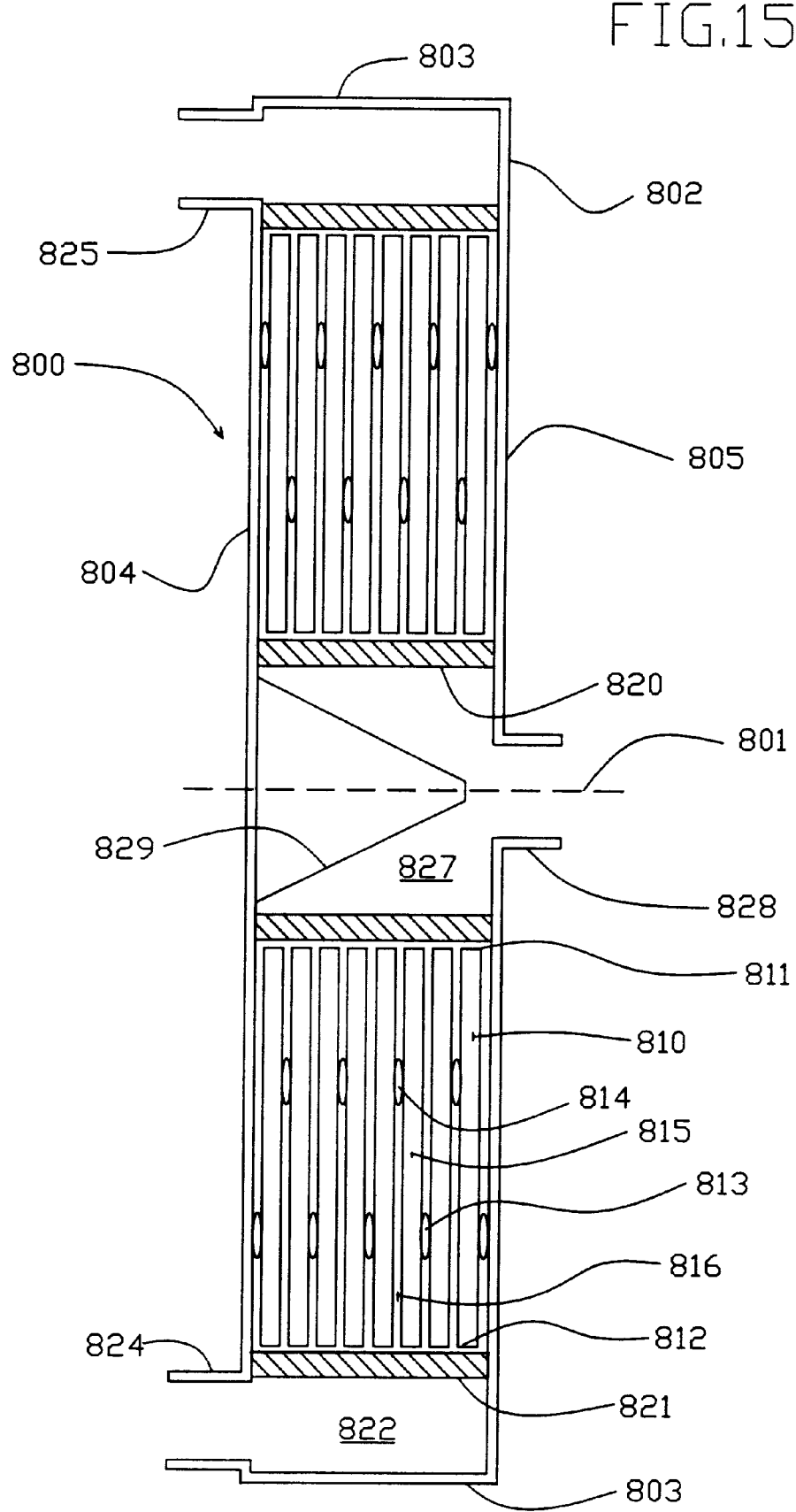
FIG. 15 shows a stacked annular disc adsorbent element.
Figure 16:
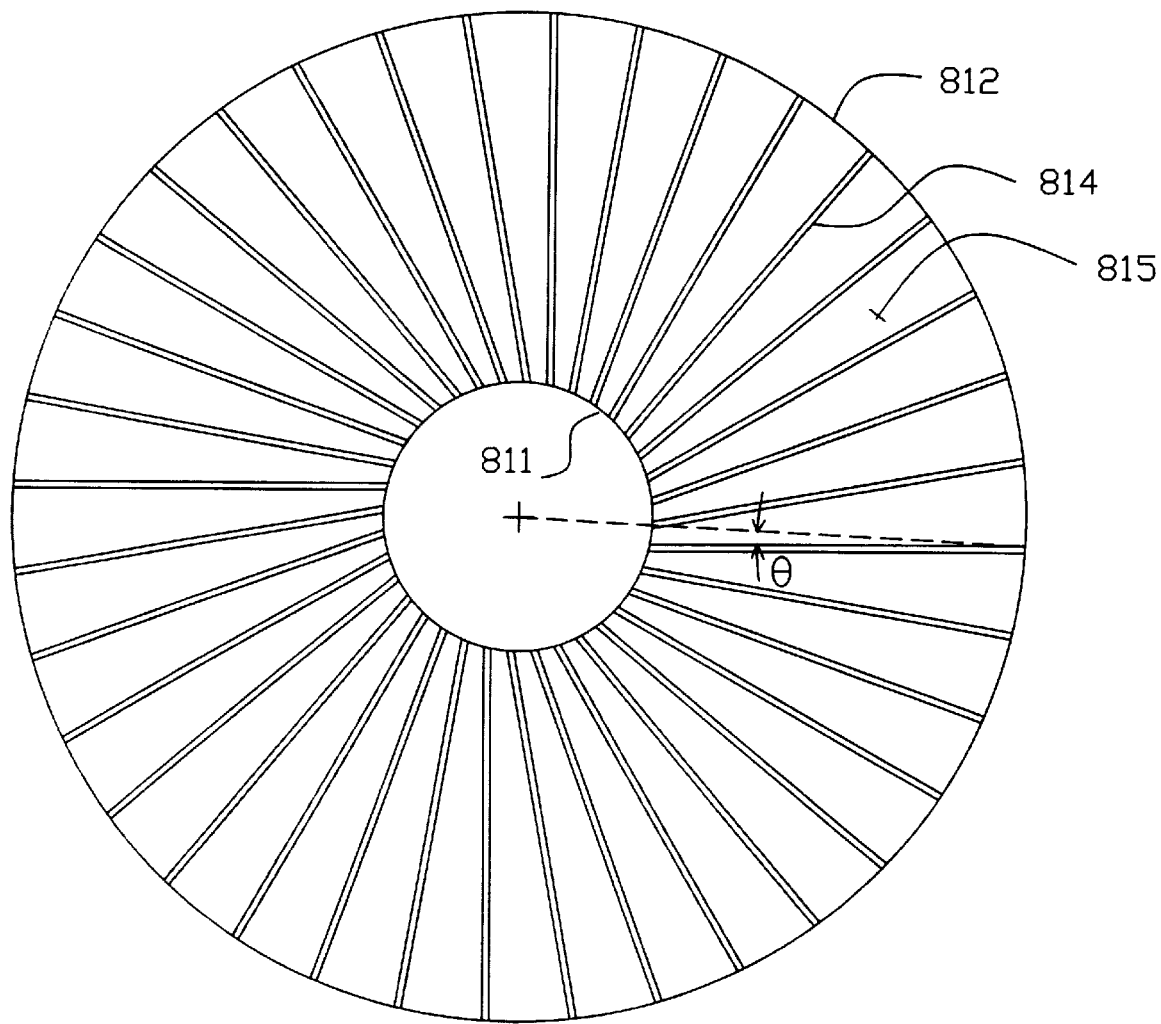
FIGS. 16, 17 and 18 show alternative spacer systems for the stacked annular disc adsorbent element.
Figure 17:
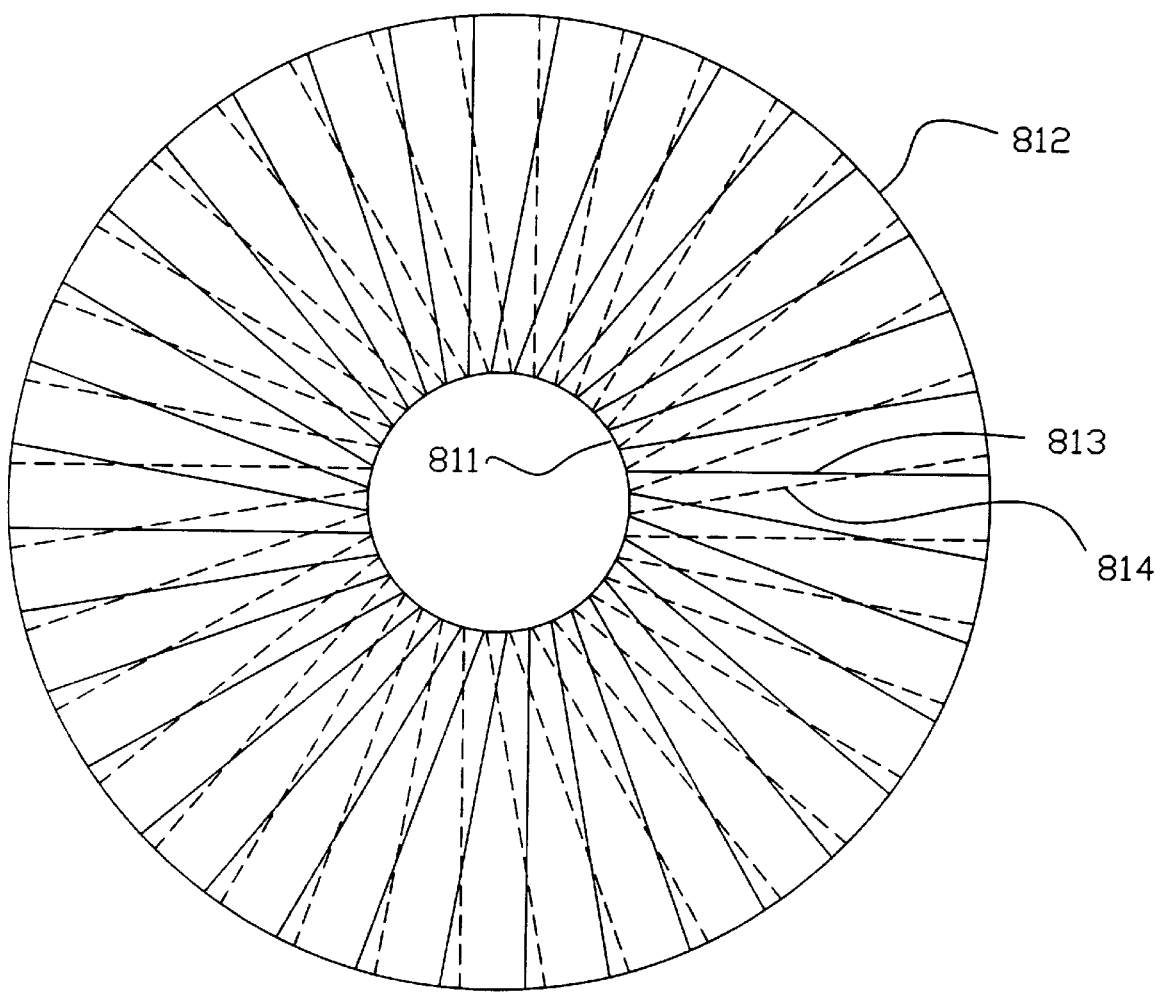

FIGS. 15, 16 and 17

FIG. 15 shows a stacked annular disc adsorbent bed 800. The adsorbent bed has an axis 801, and is contained in a circular housing 802 having an outer cylindrical wall 803, a feed end plate 804 and a product end plate 805.

The adsorbent bed is assembled from a stack of identical annular adsorbent discs 810 having an inner diameter 811 and an outer diameter 812. Spacers, such as shown in FIGS. 16 and 17, are shown as spacer fibers 813 and 814 on opposite sides of a typical adsorbent disc 815. For a stack of "M" adsorbent discs with the end plates bounding flow channels, the spacers define a number [M+1] of spaces 816 for substantially identical radial flow channels. Here the adsorbent sheets are formed as annular discs having an inner diameter and an outer diameter, the discs being stacked along their common axis between end plates and with spacers between adjacent discs so as to define flow channels with a radial flow direction. The outer diameter is the first end of the adsorber element, and the inner diameter is the second end of the adsorber element.

The discs may be formed of macroporous adsorbent material (e.g. zeolite crystallite powder in a suitable binder and glass or mineral fiber reinforcement matrix, using long and/or short fibers), or alternatively of adsorbent material such as zeolite with a suitable binder coated onto an inert sheet material such as aluminum or other metal foil. Suitable binders for zeolite include silica and/or clay minerals. The binder may also be the zeolite itself, with self-bound crystalline attachment to the support matrix or foil.

To provide improved flow distribution at minimal pressure drop, flow distributor screens 820 and 821 (e.g. of a sintered filter material of highly uniform porosity) may optionally be provided at respectively inner and outer radii of the annular disc stack. A feed plenum 822 is defined between flow distributor 821 and housing wall 803. Feed flow distribution may be further improved by providing multiple feed/exhaust ports 824 and 825, spaced equally apart. Alternatively, feed ports may be oriented tangentially, and exhaust ports may be oriented tangentially in the opposite sense, so as to improve flow distribution by generating a swirling flow in the feed plenum.

A product plenum 827 is defined inside product flow distributor 820, and communicates with product port 828. A conical baffle 829 may be provided to improve flow distribution in plenum 827.

FIG. 16 shows the spacer fibers 814 on one side of typical adsorbent disc 815. The fibers are skewed by a small angle "θ" from the radial direction. Alternating spacer layers 813 will be oppositely skewed. FIG. 17 shows fibers 814 (dashed lines) superimposed on the fibers 813 (solid lines), indicating how stability of the adsorbent disc against warping deflections is achieved by multiple oblique crossing of oppositely skewed fibers in adjacent spacer layers. Here the spacers are provided as alternatingly first and second spacer patterns, the spacer patterns defining the substantially radial flow direction, and the first and second spacer patterns being oppositely skewed with respect to the radial direction so as to provide multiple oblique crossovers of the spacer patterns, and thus to stabliize the adsorber element against deflections that would degrade the uniformity of the flow channels. Each of the spacer patterns is provided as radially extending and angularly equally spaced fibers or ridges, skewed by a small angle from the radial direction. With the adsorbent sheet discs numbered as odd and even, a first spacer pattern is provided on each odd disc, and a second spacer pattern is provided on each even disc to make up the stacked adsorber element.

FIG. 18

Figure 18:
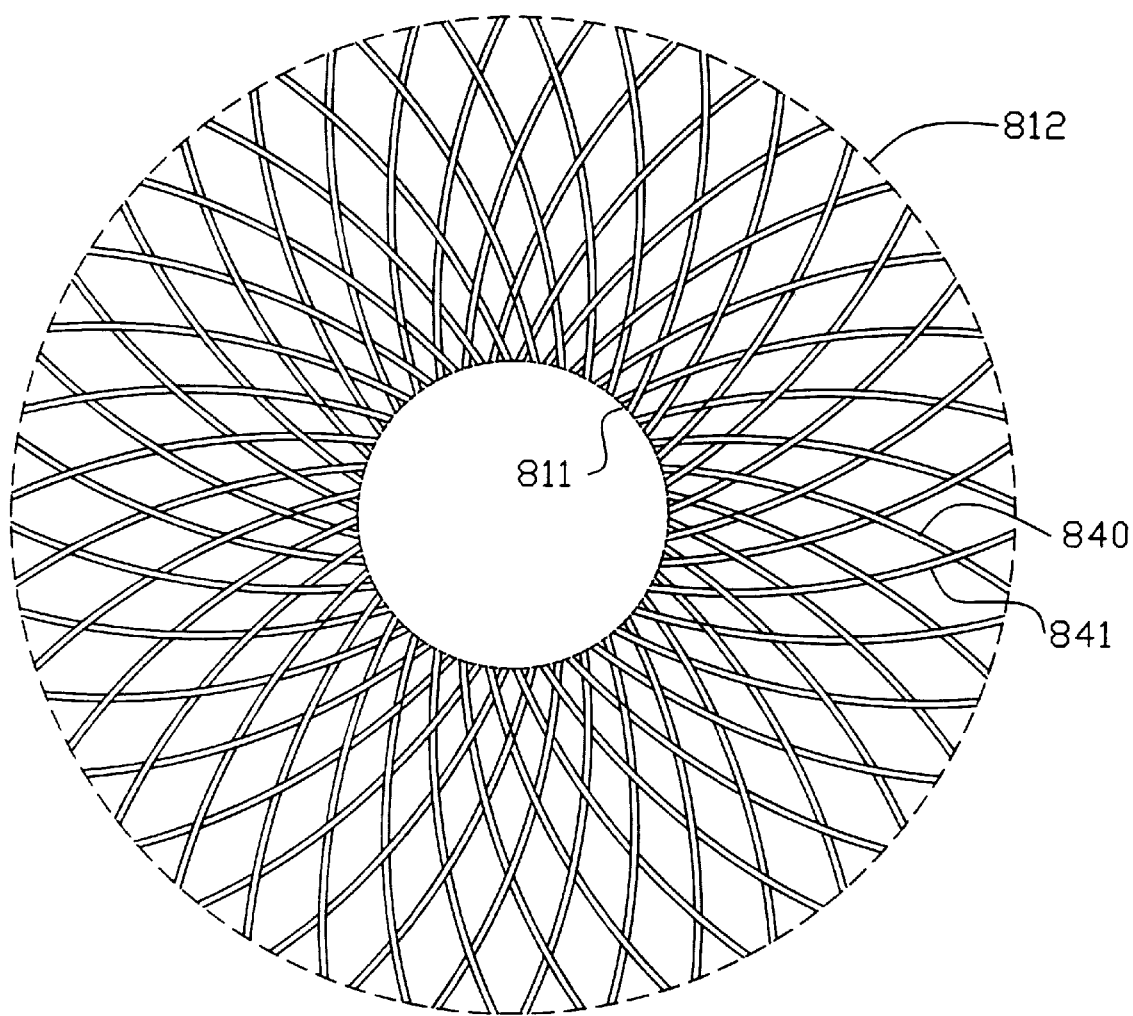

FIG. 18 shows an alternative spacer system for the stacked annular disc adsorbent bed. The spacer is here comprised of oppositely inclined fibers or yarns or wires 840 and 841, woven into a radial braided mesh. As before, the radial length of the flow passage must be a large multiple of the weave pitch distance.

Figure 19:
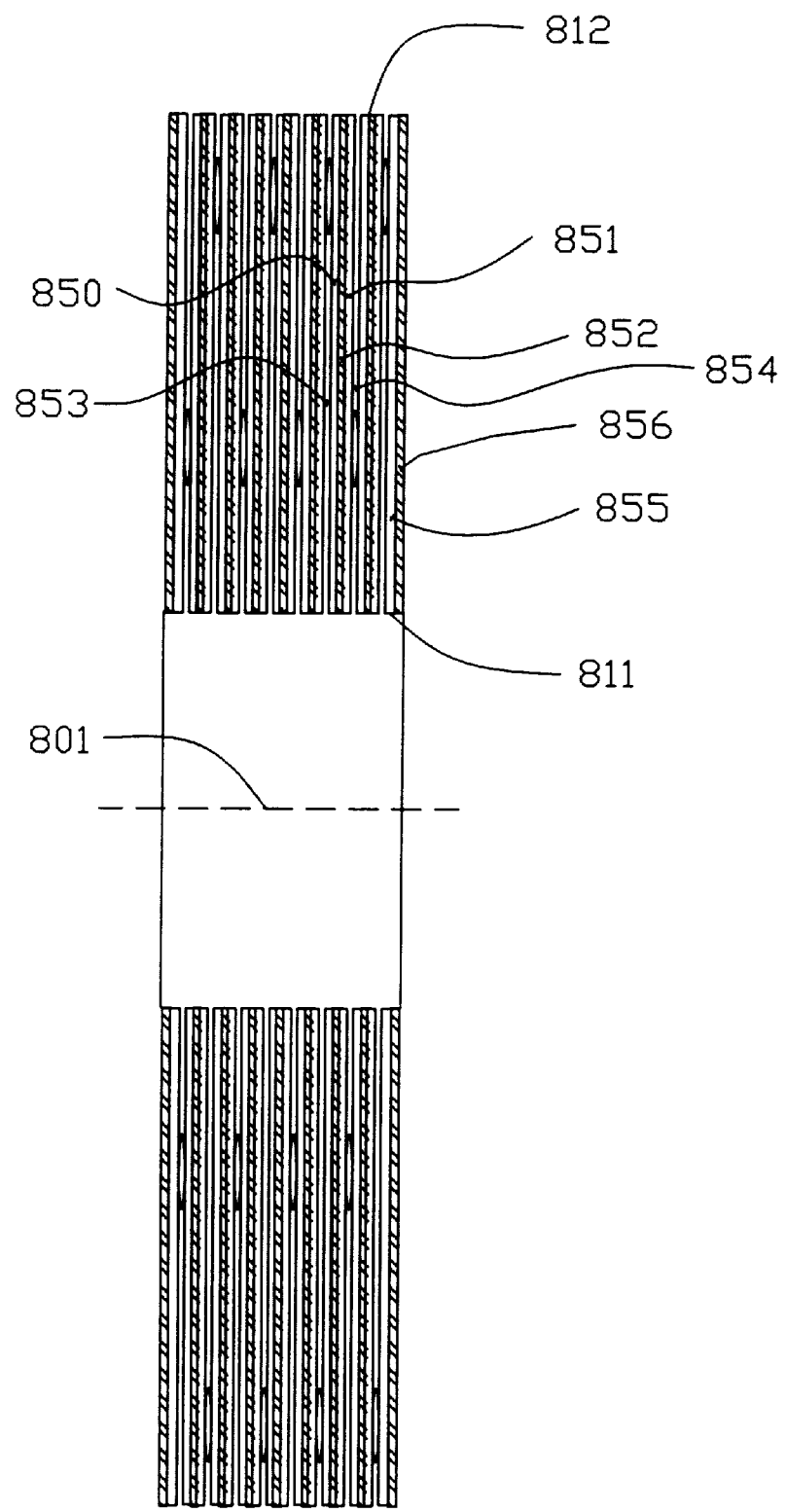
FIGS. 19 and 20 show alternative annular disc stacks with metal foil inserts.
Figure 20:
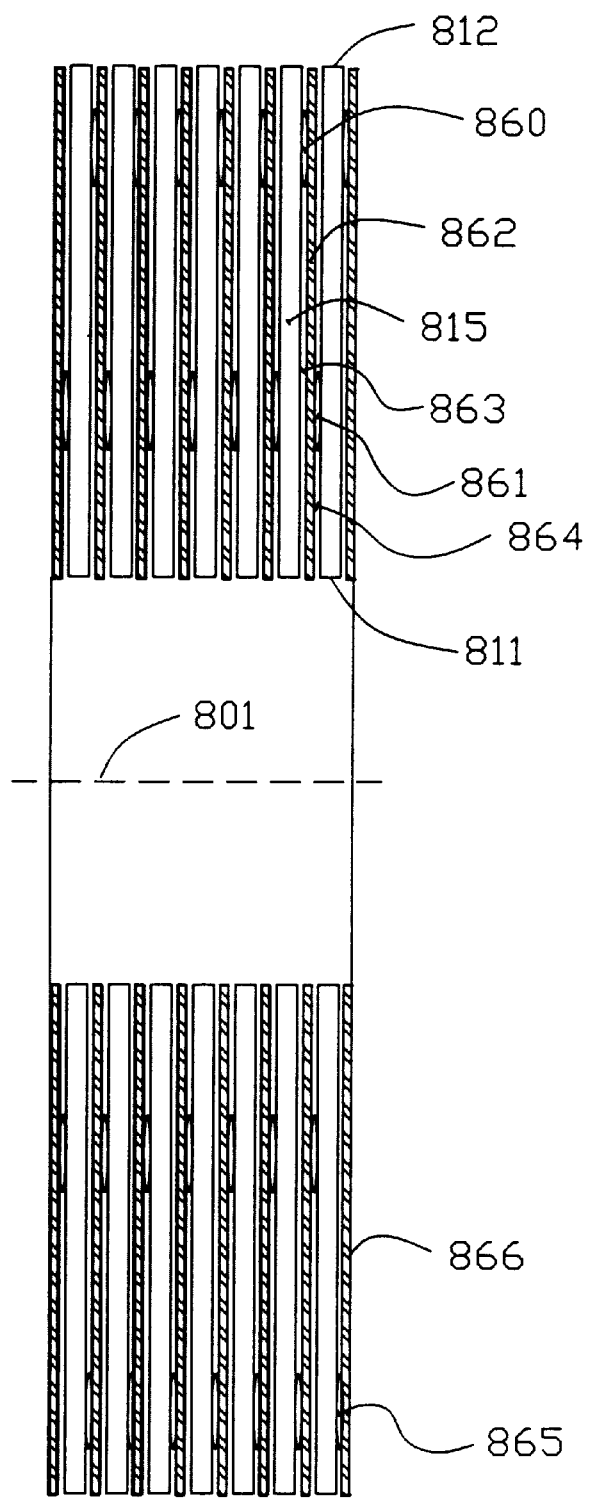
Figure 21:
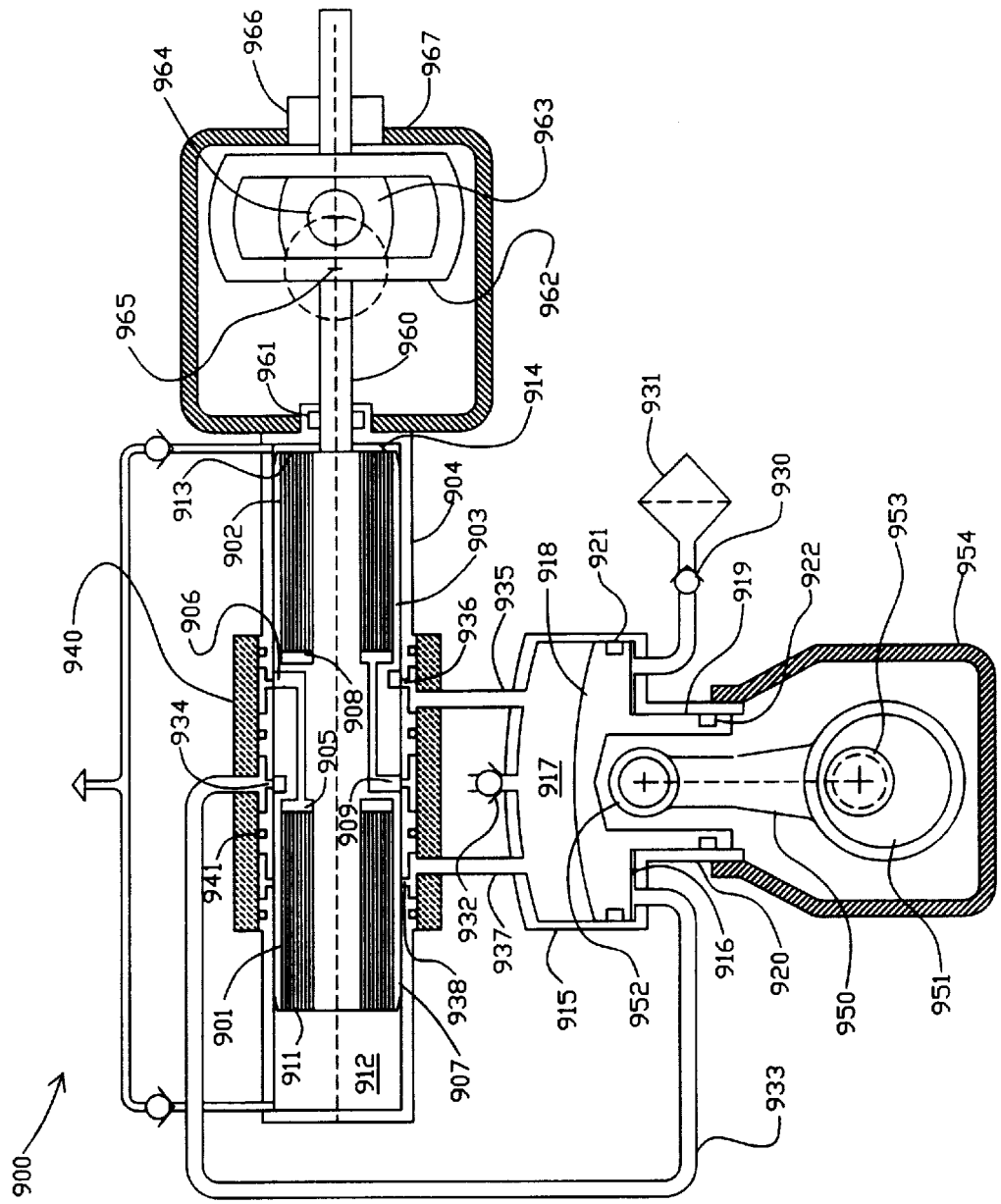
FIG. 21 is a drawing of a life support oxygen concentrator.

FIGS. 19 and 20

FIGS. 19 and 20 show alternative annular disc stacks with metal foil inserts. All adsorbent layers and flow channels operate under identical conditions, without end effects.

In FIG. 19, adsorbent layers 850 and 851 are coated on opposite sides of an aluminum foil 852. Adsorbent layer 850 contacts flow channel 853, and adsorbent layer 851 contacts flow channel 855. At the ends of the stack, adsorbent layer 851 is coated onto one side of end foil 855 which terminates the stack.

In FIG. 20, oppositely skewed spacers 860 and 861 are mounted on opposite sides of a foil 862 which separates flow channels 863 and 864. At the ends of the stack, spacer 865 is attached to one side of foil 866 terminating the stack.

FIG. 21

The final drawing shows an apparatus for life support oxygen enrichment, e.g. for medical oxygen supply to patients with pulmonary disease, oxygen enrichment for high alpine survival, or breathing air purification for survival in confined spaces such as disabled submarines or collapsed mine caverns.

Apparatus 900 has first and second spiral roll adsorber elements 901 and 902 coaxially mounted within double-acting expansion piston 903, which reciprocates with sealing contact in expansion cylinder 904. The first end 905 of adsorber element 901 communicates to first valve port 906 in the sealing wall 907 of piston 903, while the first end 908 of adsorber element 902 communicates to second valve port 909 in the sealing wall 907 of piston 903. Second end 911 of adsorber 901 communicates directly to first expansion chamber 912, while second end 913 of adsorber 902 communicates directly to second expansion chamber 914.

A double-acting feed/exhaust cylinder 915 provides the combined feed compressor and exhaust vacuum pump functions. Feed/exhaust cylinder 915 includes a feed chamber 916 and an exhaust chamber 917, separated by piston 918 on piston rod 919 reciprocating within sleeve 920. Seals 921 and 922 are provided to reduce leakage. Equivalently, piston 918 could be replaced by a flexing diaphragm or convoluted bellows.

Inlet check valve 930 is provided to admit feed flow from inlet air filter 931 into feed chamber 916. An exhaust check valve 932 is provided to discharge exhaust flow from exhaust chamber 917 to atmosphere. Feed conduit 933 communicates from feed chamber 916 to feed port 934 in the central part of expansion cylinder 904. A first exhaust conduit 935 communicates from exhaust chamber 917 to first exhaust port 936 in expansion cylinder 904, while a second exhaust conduit 937 communicates from exhaust chamber 917 to first exhaust port 938 in expansion cylinder 904. A valve body 940 is provided with static seals 941 to expansion cylinder 904 isolating the feed and exhaust ports.

In the position depicted, expansion chamber 912 is at bottom dead centre while expansion chamber 914 is at top dead centre. The first valve port 906 is open to the first exhaust port 936, the second exhaust port 938 is closed, and the second valve port 909 is open to the feed port 934. It is seen that the expansion piston and cylinder provide the function of a closed centre four-way spool valve as feed and exhaust valve means for the opposed pair of adsorber elements.

Piston 918 is reciprocated by connecting rod 950 coupling rotary crank 951 to piston rod 919 by crankpin 952. Rotary crank 951 is rotated by drive shaft 953, supported by bearings in crank housing 954. Expansion piston 903 is coupled by a small diameter piston rod 960 through rod seal 961, and is in this embodiment driven through scotch yoke 962 by slider 963, reciprocated by crankpin 964 which rotates about axis 965. The scotch yoke is supported by outboard bearing 966 in housing 967, which also supports shaft bearings on axis 965 for crankpin 964. Crankpin 964 rotates at the PSA cycle frequency, while crankshaft 953 rotates at exactly twice the PSA cycle frequency.

The 2:1 speed ratio, and the correct phase relation of an approximate 45° phase lag (in the PSA cycle) of the piston 918 reaching its bottom dead centre (minimum feed chamber volume and maximum exhaust chamber volume) after the expansion chambers have reached top or bottom dead centre, may conveniently be established by a timing belt between the parallel crankshaft 953 and the shaft of crankpin 964.

The apparatus 900 as described above is a module with two opposed adsorber elements. Two or three such modules could be combined on common shafts 953 and 965, in order to have a total of four or six adsorber elements operating in balanced phase for relatively smooth drive torque and oxygen delivery. Life support oxygen concentrators or breathing air purifiers of this type may be manually powered for survival applications.

INDUSTRIAL APPLICABILITY

At the present stage of development, successful experimental operation of adsorbent laminate modules has been achieved in a PSA unit generating high purity oxygen at 100 cycles/minute. With minor refinements and greater control of tolerances, this technology is expected to extend up to about 600 cycles/minute, consistent with reciprocation of the double-acting feed/exhaust pistons of FIG. 2 at 1200 RPM.

Because the adsorbent laminate technology will enable high cycling rates, it promises to achieve radical miniaturization of the TCPSA equipment. Hence, the objective of achieving very high energy efficiency in a much more portable medical oxygen concentrator will be achieved by this invention.

Other applications include survival life support for mountain climbing expeditions (manually powered oxygen enrichment at extreme high altitudes), and for people trapped in confined spaces (accidents in underground mines, submarine vehicles, spacecraft) needing to use all available oxygen down to low partial pressures, while being protected from build-up of carbon dioxide and any other toxic gases.

Ultracompact and energy-efficient PSA equipment may be useful for oxygen enrichment and hydrogen purification in advanced energy generation systems such as fuel cells.

The high frequency PSA systems of the present invention achieve superior control characteristics. These four bed systems feature partly or fully self-regulated cycle control, and enable high recovery because of optimally stratified light reflux.

Energy efficiency is enhanced by recovery of expansion energy, and because the feed compression and vacuum pump functions ride the working pressure in beds, on average much less than maximum positive or vacuum pressures in beds. Low pressure ratios above and below atmospheric pressure reduce adiabatic departures from ideal isothermal processes. Low friction valves minimize parasitic power loss. Efficiency is further enhanced by the minimal pressure drops in parallel channel adsorbent laminate modules.

I claim:

1. Process for separating first and second components of a feed gas mixture, the first component being more readily adsorbed over an adsorbent material under increase of pressure relative to the second component, such that a gas mixture of the first and second components contacting the adsorbent material is relatively enriched in the first component at a lower pressure and is relatively enriched in the second component at a higher pressure when the pressure is cycled between the lower and higher pressures at a cyclic frequency defining a cycle period, the process comprising the steps of:

providing for the process of number "N" of substantially similar adsorbent beds of the adsorbent material, with said adsorbent beds having first and second ends;

providing a variable volume expansion chamber for each adsorbent bed and in communication with the second end of each adsorbent bed; and performing in each adsorbent bed the sequentially repeated steps within the cycle period of:

a. supplying a flow of the feed gas mixture to the first end of the adsorbent bed during a feed time interval commencing when the pressure within the adsorbent bed is at a first intermediate pressure between the lower pressure and the higher pressure, pressurizing the adsorbent bed to substantially the higher pressure, and then continuing the flow of feed gas mixture at substantially higher pressure while withdrawing gas enriched in the second component from the second end of the adsorbent bed, and delivering gas enriched in the second component as a light product gas at a light product delivery pressure, b. withdrawing a flow of gas enriched in the second component as light reflux gas from the second end of the adsorbent bed into the expansion chamber during a cocurrent blowdown time interval, and expanding the volume of the expansion chamber so as to depressurize the adsorbent bed from the higher pressure toward a second intermediate pressure between the higher pressure and the lower pressure, c. withdrawing a flow of gas enriched in the first component from the first end of the adsorbent bed during an exhaust time interval, so as to depressurize the adsorbent bed from the second intermediate pressure to the lower pressure, and then contracting the volume of the expansion chamber so as to supply the light reflux gas from the expansion chamber to the second end of the adsorbent bed to purge the adsorbent bed at substantially the lower pressure while continuing to withdraw gas enriched in the first component as a heavy product gas, and d. further contracting the expansion chamber so as to supply the light reflux gas from the expansion chamber to the second end of the adsorbent bed during a light reflux pressurization time interval, to increase the pressure of the adsorbent bed from substantially the lower pressure to the first intermediate pressure.

2. The process of claim 1, further varying the cyclic frequency so as to achieve a desired purity, recovery and flow rate of the light product gas.

3. The process of claim 1, further varying a flow rate of the feed gas mixture and a flow rate of the light product gas at the cyclic frequency, so as to achieve a desired light product gas purity.

4. The process of claim 1, in which the light product delivery pressure is substantially the higher pressure.

5. The process of claim 4, further varying the light product delivery pressure at the cyclic frequency, so as to achieve a desired light product gas purity and flow rate.

6. The process of claim 1, further heating gas that is flowing between the second end of each adsorbent bed and the expansion chamber for that bed.

7. The process of claim 1, in which the first intermediate pressure and the second intermediate pressure are substantially equal.

8. The process of claim 1, in which the first intermediate pressure is substantially atmospheric pressure, so that the lower pressure is subatmospheric.

9. The process of claim 1, in which the first component is an impurity gas or vapour, the gas mixture is air containing the impurity, and the light product gas is purified air.

10. The process of claim 1, in which the first component is nitrogen, the second component is oxygen, the adsorbent material includes a nitrogen-selective zeolite, the gas mixture is air, and the light product gas is enriched oxygen.

11. Apparatus for separating first and second components of a feed gas mixture, the first component being more readily adsorbed over an adsorbent material under increase of pressure relative to the second component, such that a gas mixture of the first and second components contacting the adsorbent material is relatively enriched in the first component at a higher pressure when the pressure is cycled between the lower and higher pressures at a cyclic frequency defining a cycle period, the apparatus including:

a. a number "N" of substantially similar adsorbent beds of the adsorbent material, with said adsorbent beds having first and second ends defining a flow path through the adsorbent material, b. a feed valve means and an exhaust valve means connected to the first end of each adsorbent bed, c. valve actuation means to actuate the feed valve means and the exhaust valve means, so that at any instant one of the feed or exhaust valve means may be open with the other closed or else both of the feed and exhaust valve means are closed, d. feed supply means to introduce the feed gas mixture to the feed valve means at a feed pressure, e. exhaust means to remove gas enriched in the first component from the exhaust valve means;

f. light product delivery means to deliver a light product flow of gas enriched in the second component from the second ends of the adsorbent beds;

g. a variable volume expansion chamber communicating with the second end of each adsorbent bed; and h. expansion chamber cycling means to vary the volume of the expansion chamber between minimum and maximum volumes of the expansion chamber at the cyclic frequency, with the minimum volume being reached at a top dead centre time within the cycle period, and the maximum volume being reached at a bottom dead centre time within the cycle period;

and the valve actuation means cooperates with the expansion chamber cycling means so that for each adsorbent bed:

i. the valve actuation means opens the feed valve means when the expansion chamber is approaching its minimum volume, when the pressure in the adsorbent bed is less than the higher pressure keeps the feed valve means open during a feed time interval while the expansion chamber cycling means brings the volume of the expansion chamber past its minimum volume and the pressure in the adsorbent bed has risen to substantially the higher pressure, and closes the feed valve following the top dead centre time by a feed phase lag interval, ii. the valve actuation means opens the exhaust valve means when the expansion chamber is approaching its maximum volume, when the pressure in the adsorbent bed is greater than the minimum pressure keeps the exhaust valve means open during an exhaust time interval while the expansion chamber cycling means brings the volume of the expansion chamber past its maximum volume and the pressure in the adsorbent bed has dropped to substantially the lower pressure, and closes the exhaust valve means following the top dead centre time by an exhaust phase lag interval, and iii. the valve actuation means keeps both the feed and exhaust valve means closed during a cocurrent blowdown time interval while the pressure in the adsorbent bed is decreasing between the feed and exhaust time intervals, and during a light reflux pressurization time interval while the pressure in the adsorbent bed is increasing between the exhaust and subsequent feed time intervals, with the cycle period being equal to the sum of the feed, cocurrent blowdown, exhaust and light reflux pressurization time intervals.

12. The apparatus of claim 11, in which the feed time interval, cocurrent blowdown time interval, exhaust time interval and light reflux pressurization interval are each approximately equal to one quarter of the cycle period.

13. The apparatus of claim 11, in which the feed phase lag interval is substantially equal to the exhaust phase lag interval.

14. The apparatus of claim 13, in which the feed phase lag interval is in the range of approximately 30° to 45°, with the cycle period being 360° of phase.

15. The apparatus of claim 11, in which the expansion chamber cycling means and the valve actuation means cooperate to establish a relative cycle phase for commencing the feed step for each of the adsorbent beds, such that the relative cycle phases for the adsorbent beds are spaced equally apart with a phase difference of 360°/N.

16. The apparatus of claim 11, in which the expansion chamber is defined by a piston reciprocating within a cylinder.

17. The apparatus of claim 16 in which the expansion chamber cycling means is a reciprocating linkage coupled to the piston and to a rotary crankshaft.

18. The apparatus of claim 11, with heater means interposed between the second end of the adsorbent bed and the expansion chamber communicating with that adsorbent bed.

19. The apparatus of claim 11, in which the feed valve means and the exhaust valve means for each bed are provided as poppet valves.

20. The apparatus of claim 19, in which the valves are normally closed, and are opened by cam lifters with a rotary cam as the valve actuation means.

21. The apparatus of claim 11, in which the feed valve means and the exhaust valve means together comprise a multiport rotary distributor valve for each of a cooperating set of the adsorbent beds.

22. The apparatus of claim 11, in which the feed and exhaust valve means together comprise a closed centre three-way valve for each adsorbent bed.

23. The apparatus of claim 22, in which the expansion chamber comprises an expansion cylinder and an expansion piston whose wall forms a sealing contact within the expansion cylinder, with the adsorbent beds being installed within the expansion piston and with the adsorbent bed second ends communicating with the expansion chamber and the adsorbent bed first ends communicating with a valve port through the wall of the expansion piston, and the expansion cylinder has a wall having a feed port communicating with the feed supply means and an exhaust port communicating with the exhaust means, such that the valve port is open to the feed port and the exhaust port is closed when the expansion piston is at or near its top dead centre position, the valve port is open to the exhaust port and the feed port is closed when the expansion piston is at or near its bottom dead centre position, and the valve port, feed port and exhaust port are all closed to fluid flow when the expansion piston is at or near an intermediate position between its top and bottom dead centre positions.

24. The apparatus of claim 23, in which the adsorbent bed is provided as an adsorbent element formed from layered adsorbent sheets, the sheets being the adsorbent material with a reinforcement material, with spacers between the sheets to establish flow channels in a flow direction tangential to the sheets and between adjacent pairs of sheets.

25. The apparatus of claim 24, in which the adsorbent element is formed as a spiral roll by rolling one of the adsorbent sheets spirally about a cylindrical mandrel, with the spacers establishing the flow channels between radially adjacent layers of the roll, so that the mandrel defines a core of the spiral roll, and the spiral roll is installed with the core substantially concentric inside the expansion piston, with the flow channels extending in a flow direction substantially parallel to the axis of the spiral roll established by the axis of the mandrel, the flow channels having a first end and a second end at axially separated opposite ends of the spiral roll.

26. The apparatus of claim 11, in which the number "N" of adsorbent beds is an even number, an opposed pair of beds is defined as a first bed and a second bed with a relative cycle phase difference of 180° between the first and second adsorbent beds, and there are N/2 opposed pairs of the adsorbent beds.

27. The apparatus of claim 26, in which the feed and exhaust valve means together comprise a closed centre four-way valve for each opposed pair of adsorbent beds.

28. The apparatus of claim 26, in which the expansion chamber comprises an expansion cylinder and an expansion piston whose wall forms a sealing contact within the expansion cylinder, with each opposed pair of adsorbent beds being installed within the expansion piston, the expansion piston defining first and second expansion spaces at opposite ends of the expansion cylinder, with the second end of the first adsorbent bed communicating with the first expansion space and the second end of the second adsorbent bed communicating with the second expansion space, with the first end of the first adsorbent bed communicating with a first valve port in the sealing wall of the expansion piston and the first end of the second adsorbent bed communicating with a second valve port in the sealing wall of the expansion piston, and the expansion cylinder has a wall having a feed port communicating with the feed supply means and exhaust ports communicating with the exhaust means, such that the expansion piston in the expansion cylinder functions as a closed centre four-way spool valve as the feed valve means and exhaust valve means for that pair of adsorbent beds.

29. The apparatus of claim 28, with the double-acting expansion piston coupled by a small diameter piston rod, with the piston rod reciprocated by a scotch yoke drive.

30. The apparatus of claim 26, in which for each opposed pair of adsorbent beds, the feed supply means includes a feed chamber, the feed chamber communicating to an inlet check valve and to the feed valve means for the opposed pair of adsorbent beds, and with reciprocating drive means to reciprocate the feed chamber at twice the cycle frequency so as to perform a feed step for each bed of the opposed pair during a cycle.

31. The apparatus of claim 30, in which for each opposed pair of adsorbent beds, the exhaust means includes an exhaust chamber, the exhaust chamber communicating to an exhaust check valve and to the exhaust valve means for the opposed pair of adsorbent beds, and with reciprocating drive means to reciprocate the exhaust chamber at twice the cycle frequency so as to perform an exhaust step for each bed of the opposed pair during a cycle.

32. The apparatus of claim 31, in which the feed chamber and the exhaust chamber are provided within a feed/exhaust cylinder, the cylinder enclosing the feed chamber and exhaust chamber separated by a piston on a piston rod, with the piston rod penetrating the feed chamber so that the ratio of the swept volume of the exhaust chamber to the swept volume of the feed chamber is $[D^2/(D^2-d^2)]$ for piston diameter "D" and piston rod diameter "d", and with the reciprocating drive means coupled to the piston rod.

33. The apparatus of claim 32, with two opposed pairs of adsorbent beds phased 90° apart, and with two opposed feed/exhaust cylinders with their pistons coupled to opposite ends of a common piston rod as feed supply means and exhaust means for the four adsorbent beds.

34. The apparatus of claim 33, with the common piston rod reciprocated by a scotch yoke drive.

35. The apparatus of claim 11, in which each adsorbent bed is provided as an adsorbent element formed from layered adsorbent sheets, the sheets being the adsorbent material with a reinforcement material, with spacers between the sheets to establish flow channels in a flow direction tangential to the sheets and between adjacent pairs of sheets.

36. The apparatus of claim 35, with the adsorbent sheet formed of a glass or mineral fiber reinforcement matrix, and loaded with zeolite crystallite powder with a binder.

37. The apparatus of claim 35, with the adsorbent sheet formed of an aluminum foil, coated on one or both sides with a zeolite adsorbent and a binder.

38. The apparatus of claim 35, in which the adsorbent element is formed as a spiral roll by rolling one of the adsorbent sheets spirally about a cylindrical mandrel, with the spacers establishing the flow channels between radially adjacent layers of the roll, so that the mandrel defines a core of the spiral roll, and the spiral roll is installed with the core substantially concentric inside a cylindrical housing, with the flow channels extending in a flow direction substantially parallel to the axis of the spiral roll established by the axes of the mandrel and the housing, the flow channels having a first end and a second end at axially separated opposite ends of the spiral roll.

39. The apparatus of claim 38, in which the adsorbent element includes a metal foil layer backing the one adsorbent sheet so that each said adsorbent layer contacts the metal foil on one side and one of the flow channels on the other side.

40. The apparatus of claim 38, in which two of the adsorbent layers are disposed on both sides of each said flow channel, with an aluminum foil layer backing each said adsorbent layer.

41. The apparatus of claim 38, in which the adsorbent element includes an impervious layer associated with each said adsorbent layer, the spacers comprise embossed portions of the impervious layers, and the flow channels comprise a first channel disposed between one side of the impervious layer and the associated adsorbent layer and a second channel disposed between an opposite side of the impervious layer and an adjacent one of the adsorbent layers.

42. The apparatus of claim 41, in which the impervious layer is an aluminum foil.

43. The apparatus of claim 38, in which the spacers are provided as a woven mesh.

44. The apparatus of claim 38, in which one of the adsorbent layers includes first and second spacer patterns on opposite sides thereof, each of the spacer patterns having an axis of symmetry, and the first and second spacer patterns being oppositely skewed relative to the axis of the spiral roll so as to provide multiple oblique cross-overs of the first and second spacer patterns, and thus to stabilize the spiral roll against deflections that would degrade the uniformity of the flow channels.

45. The apparatus of claim 38, in which the spacers are provided as an embossed pattern on the one adsorbent sheet.

46. The apparatus of claim 35, in which the adsorbent element is formed as a spiral roll by rolling a number "M" of the adsorbent sheets spirally about a cylindrical mandrel, with the spacers establishing the flow channels between radially adjacent layers of the roll and the adsorbent sheets being rolled about the mandrel with start points angularly spaced 360°/M apart.

47. The apparatus of claim 46, in which the spacers associated with alternate ones of the layers are disposed in a first spacer pattern and the spacers associated with the remaining ones of layers are disposed in a second spacer pattern, with each of the spacer patterns having an axis of symmetry, the first and second spacer patterns being oppositely skewed relative to the axis of the spiral roll so as to provide multiple oblique crossovers of the first and second spacer patterns, and thus to stabilize the spiral roll against deflections that would degrade the uniformity of the flow channels.

48. The apparatus of claim 47, in which each of the first and second spacer patterns is provided as parallel fibers extending in the nominal flow direction, with the flow channel height nominally equal to the diameter or width of the fibers.

49. The apparatus of claim 35, in which the adsorbent sheets are formed as annular discs having an inner diameter and an outer diameter, the discs being stacked along their common axis between end plates and with spacers between adjacent discs so as to provide the flow channels with a radial flow direction.

50. The apparatus of claim 49, in which the outer diameter is the first end of the adsorber element, and the inner diameter is the second end of the adsorber element.

51. The apparatus of claim 49, in which the spacers are provided as alternatingly first and second spacer patterns, the spacer patterns defining the substantially radial flow direction, and the first and second spacer patterns being oppositely skewed with respect to the radial direction so as to provide multiple oblique crossovers of the spacer patterns, and thus to stabilize the adsorber element against deflections that would degrade the uniformity of the flow channels.

52. The apparatus of claim 51, in which each of the spacer patterns is provided as radially extending and angularly equally spaced fibers or ridges, skewed by a small angle from the radial direction.

53. The apparatus of claim 51, in which alternate ones of the discs are provided with the first spacer pattern, and remaining ones of the discs are provided with the second spacer pattern.

54. The apparatus of claim 51, in which the first and second spacer patterns are provided on opposite sides of a metal foil to provide the spacers between one of the adjacent pairs of the adsorbent sheet discs, and one of the first and second spacer patterns is provided between each end plate and the adsorbent sheet disc adjacent that end plate.

55. The apparatus of claim 11, in which the feed supply means includes a compressor, and the exhaust means includes a vacuum pump.

56. The apparatus of claim 55, in which the compressor is a blower compressing air from nominally atmospheric pressure to a pressure rising to the higher pressure within each feed step for an adsorbent bed.

57. The apparatus of claim 55, in which the number of beds is N=4.

58. Apparatus for separating first and second components of a feed gas mixture, the first component being more readily adsorbed over an adsorbent material under increase of pressure relative to the second component, such that a gas mixture of the first and second components contacting the adsorbent material is relatively enriched in the first component at a lower pressure and is relatively enriched in the second component at a higher pressure when the pressure is cycled between the lower and higher pressures at a cyclic frequency defining a cycle period, the apparatus including:
 a. a number "N" of substantially similar adsorbent beds of the adsorbent material, with said adsorbent beds having first and second ends defining a flow path through the adsorbent material,
 b. a feed valve means and an exhaust valve means connected to the first end of each adsorbent bed,
 c. valve actuation means to actuate the feed valve means and the exhaust valve means, so that at any instant one of the feed or exhaust valve means may be open with the other closed or else both of the feed and exhaust valve means are closed,
 d. feed supply means to introduce the feed gas mixture to the feed valve means at a feed pressure,
 e. exhaust means to remove gas enriched in the first component from the exhaust valve means,
 f. light product delivery means to deliver a light product flow of gas enriched in the second component from the second ends of the adsorbent beds,
 g. a light reflux rotary distributor valve connected in parallel to the second ends of the adsorbent beds, the distributor valve having a stator and a rotor rotatable about an axis, the stator and rotor comprising a pair of relatively rotating valve elements, the valve elements being engaged in fluid sealing sliding contact in a valve surface, the valve surface being a surface of revolution coaxial to the axis, each of the valve elements having a plurality of ports to the valve surface and in sequential sliding registration with the ports in the valve surface of the other valve elements, the stator being a bed port element having N bed ports each communicating to the second end of one of the N adsorbent beds, and the rotor being a function port element having a plurality of function ports in pairs connected within the rotor by light reflux channels, with the bed ports spaced apart by equal angular separation between adjacent ports, with the function ports and bed ports at the same radial position on the valve surface so that each function port is opened in sequence to each of the N bed ports by relative rotation of the valve elements, and with fluid sealing sliding contact between the stator and rotor of the distributor valve; and
 h. drive means to establish rotation of the rotor.

59. The apparatus of claim 58, in which the feed valve and exhaust valve for each bed are provided as poppet valves.

60. The apparatus of claim 58, further providing a product delivery check valve for each adsorbent bed communicating from the second end of that adsorbent bed to a light product manifold, and delivering the light product through the product delivery check valves.

61. The apparatus of claim 58, with an even number "N" of adsorbent beds including N/2 pairs of adsorbent beds phased 180° apart; and for each opposed pair of adsorbent beds, the feed supply means includes a feed chamber, the feed chamber communicating to an inlet check valve and to the feed valve means for the opposed pair of adsorbent beds, and with reciprocating drive means to reciprocate the feed chamber at twice the cycle frequency so as to perform a feed step for each bed of the opposed pair during a cycle.

62. The apparatus of claim 61, in which for each opposed pair of adsorbent beds, the exhaust means includes an exhaust chamber, the exhaust chamber communicating to an exhaust check valve and to the exhaust valve means for the opposed pair of adsorbent beds, and with reciprocating drive means to reciprocate the exhaust chamber at twice the cycle frequency so as to perform an exhaust step for each bed of the opposed pair during a cycle.

63. The apparatus of claim 62, in which the feed chamber and the exhaust chamber are provided within a feed/exhaust cylinder, the cylinder enclosing the feed chamber and exhaust chamber separated by a piston on a piston rod, with the piston rod penetrating the feed chamber so that the ratio of the swept volume of the exhaust chamber to the swept volume of the feed chamber is $[D^2/(D^2-d^2)]$ for piston diameter "D" and piston rod diameter "d", and with the reciprocating drive means coupled to the piston rod.

64. The apparatus of claim 63, with two opposed pairs of adsorbent beds phased 90° apart, and with two opposed feed/exhaust cylinders with their pistons coupled to opposite ends of a common piston rod as feed supply means and exhaust means for the four adsorbent beds.

65. The apparatus of claim 58, in which each adsorbent bed is provided as an adsorbent element formed from layered adsorbent sheets, the sheets being the adsorbent material with a reinforcement material, with spacers between the sheets to establish flow channels in a flow direction tangential to the sheets and between adjacent pairs of sheets.

66. Adsorber element for contacting an adsorbent material to a fluid mixture, the adsorber element being formed from layered thin and flexible adsorbent sheets, the sheets being the adsorbent material with a reinforcement material, with spacers between the sheets to establish flow channels in a flow direction tangential to the sheets and between adjacent pairs of sheets, the adsorber elements having first and second ends defining a flow path with a nominal flow direction through the adsorber element, and with the spacers provided as alternatingly first and second spacer patterns, the spacer patterns defining the substantially radial flow direction, and the first and second spacer patterns being oppositely skewed with respect to the nominal flow direction so as to provide multiple oblique crossovers of the spacer patterns, and thus to stabilize the adsorber element against deflections that would degrade the uniformity of the flow channels.

67. The adsorber element of claim 66, with the adsorbent sheet formed of a glass or mineral fiber reinforcement matrix, and loaded with zeolite crystallite powder with a binder.

68. The adsorber element of claim 66, with the adsorbent sheet formed of an aluminum foil, coated on one or both sides with a zeolite adsorbent and a binder.

69. The adsorber element of claim 66, in which the adsorber element is formed as a spiral roll by rolling one of the adsorbent sheets spirally about a cylindrical mandrel, with the spacers establishing flow channels between radially adjacent layers of the roll, so that the mandrel defines a core of the spiral roll, and the spiral roll is installed with the core substantially concentric inside a cylindrical housing, with the flow channels extending in a nominal flow direction parallel to the axis of the spiral roll established by the axes of the mandrel and the housing, the flow channels having a first end and a second end at axially opposed ends of the spiral roll.

70. The adsorber element of claim 69, in which one of the adsorbent layers includes first and second spacer patterns on opposite sides thereof, each of the spacer patterns having an axis of symmetry, the first and second spacer patterns being oppositely skewed relative to the axis of the spiral roll so as to provide multiple oblique cross-overs of the first and second spacer patterns, and thus to stabilize the spiral roll against deflections that would degrade the uniformity of the flow channels.

71. The apparatus of claim 66, in which the adsorber element is formed as a spiral roll by rolling a number "M" of the adsorbent sheets spirally about a cylindrical mandrel, with the spacers establishing the flow channels between radially adjacent layers of the roll, and the adsorbent sheets being rolled about the mandrel with start pints angularly spaced 360°/M apart.

72. The apparatus of claim 71, in which the spacers associated with alternate ones of the layers are disposed in a first spacer pattern and the spacers associated with the remaining layers are disposed in a second spacer pattern, with each of the spacer patterns having an axis of symmetry, the first and second spacer patterns being oppositely skewed relative to the axis of the spiral roll so as to provide multiple oblique cross-overs of the first and second spacer patterns, and thus to stabilize the spiral roll against deflections that would degrade the uniformity of the flow channels.

73. The apparatus of claim 72, in which each of the first and second spacer patterns is provided as parallel fibers extending in the nominal flow direction, with the flow channel height nominally equal to the diameter or width of the fibers.

74. The apparatus of claim 66, in which the spacers are provided as an embossed pattern on one of the adsorbent sheets.

75. The apparatus of claim 66, in which the adsorbent sheets are formed as annular discs having an inner diameter and an outer diameter, the discs being stacked along their common axis between end plates and with spacers between adjacent discs so as to provide the flow channels with a nominal radial flow direction, and the spacers are provided as alternatingly first and second spacer patterns, the spacer patterns defining the substantially radial flow direction, and the first and second spacer patterns being oppositely skewed with respect to the radial direction so as to provide multiple oblique cross-overs of the spacer patterns, and thus to stabilize the adsorber element against deflections that would degrade the uniformity of the flow channels.

76. The apparatus of claim 75, in which each of the spacer patterns is provided as radially extending and angularly equally spaced fibers or ridges, skewed by a small angle from the radial direction.

\* \* \* \* \*